United States Patent
Donlin et al.

(10) Patent No.: US 11,922,223 B1
(45) Date of Patent: Mar. 5, 2024

(54) FLEXIBLE DATA-DRIVEN SOFTWARE CONTROL OF RECONFIGURABLE PLATFORMS

(71) Applicant: Xilinx, Inc., San Jose, CA (US)

(72) Inventors: Adam P. Donlin, San Jose, CA (US); Kyle Corbett, Campbell, CA (US); Lizhi Hou, Santa Clara, CA (US); Julian M. Kain, Longmont, CO (US)

(73) Assignee: Xilinx, Inc., San Jose, CA (US)

( * ) Notice: Subject to any disclaimer, the term of this patent is extended or adjusted under 35 U.S.C. 154(b) by 532 days.

(21) Appl. No.: 17/170,427

(22) Filed: Feb. 8, 2021

(51) Int. Cl.
G06F 9/50 (2006.01)
G06F 9/38 (2018.01)
H04L 9/06 (2006.01)

(52) U.S. Cl.
CPC .......... *G06F 9/5077* (2013.01); *G06F 9/3836* (2013.01); *G06F 9/3877* (2013.01); *H04L 9/0643* (2013.01)

(58) Field of Classification Search
CPC .... G06F 9/5077; G06F 9/3836; G06F 9/3877; H04L 9/0643
See application file for complete search history.

(56) References Cited

U.S. PATENT DOCUMENTS

| | | | |
|---|---|---|---|
| 6,091,263 A | 7/2000 | New et al. |
| 6,150,839 A | 11/2000 | New et al. |
| 6,204,687 B1 | 3/2001 | Schultz et al. |
| 6,462,579 B1 | 10/2002 | Camilleri et al. |
| 6,507,211 B1 | 1/2003 | Schultz et al. |
| 6,525,562 B1 | 2/2003 | Schultz et al. |
| 6,526,557 B1 | 2/2003 | Young et al. |
| 6,573,748 B1 | 6/2003 | Trimberger |
| 6,625,794 B1 | 9/2003 | Trimberger |
| 6,759,869 B1 | 7/2004 | Young et al. |
| 6,810,514 B1 | 10/2004 | Alfke et al. |
| 6,836,842 B1 | 12/2004 | Guccione et al. |
| 6,907,595 B2 | 6/2005 | Curd et al. |
| 7,024,651 B1 | 4/2006 | Camilleri et al. |
| 7,057,413 B1 | 6/2006 | Young et al. |
| 7,109,750 B2 | 9/2006 | Vadi et al. |

(Continued)

OTHER PUBLICATIONS

Xilinx, Alveo U50 Data Center Accelerator Card Data Sheet, DS965 (v1.7.1) Aug. 27, 2020, Product Specification, 17 pages.

(Continued)

*Primary Examiner* — Daniel D Chang
(74) *Attorney, Agent, or Firm* — Kevin T. Cuenot

(57) ABSTRACT

Control of a reconfigurable platform can include determining, by a host computer, an interface universally unique identifier (UUID) of an interface of platform circuitry implemented on an accelerator, wherein the accelerator is communicatively linked to the host computer. An electronic request to run a partition design on the accelerator is received by the host computer. In response to the electronic request, the host computer determines an interface UUID for an interface of the partition design and determines compatibility of the partition design with the platform circuitry based on a comparison of the interface UUID of the partition design with the interface UUID of the platform circuitry. The partition design is implemented on the accelerator in response to determining that the partition design is compatible with the platform circuitry.

20 Claims, 12 Drawing Sheets

(56) References Cited

U.S. PATENT DOCUMENTS

| | | | |
|---|---|---|---|
| 7,124,338 | B1 | 10/2006 | Mark et al. |
| 7,138,820 | B2 | 11/2006 | Goetting et al. |
| 7,218,137 | B2 | 5/2007 | Vadi et al. |
| 7,224,184 | B1 | 5/2007 | Levi et al. |
| 7,233,532 | B2 | 6/2007 | Vadi et al. |
| 7,235,999 | B2 | 6/2007 | Goetting et al. |
| 7,302,625 | B1 | 11/2007 | Payakapan et al. |
| 7,477,072 | B1 | 1/2009 | Kao et al. |
| 7,478,357 | B1 | 1/2009 | Mason et al. |
| 7,482,836 | B2 | 1/2009 | Levi et al. |
| 7,509,617 | B1 | 3/2009 | Young |
| 7,518,396 | B1 | 4/2009 | Kondapalli et al. |
| 7,546,572 | B1 | 6/2009 | Ballagh et al. |
| 7,599,299 | B2 | 10/2009 | Goetting et al. |
| 7,619,442 | B1 | 11/2009 | Mason et al. |
| 7,640,527 | B1 | 12/2009 | Dorairaj et al. |
| 7,724,815 | B1 | 5/2010 | Raha et al. |
| 7,746,099 | B1 | 6/2010 | Chan et al. |
| 8,102,188 | B1 | 1/2012 | Chan et al. |
| 8,359,448 | B1 | 1/2013 | Neuendorffer |
| 8,415,974 | B1 | 4/2013 | Lysaght |
| 8,719,750 | B1 | 5/2014 | Balzli, Jr. |
| 8,928,351 | B1 | 1/2015 | Konduru |
| 9,722,613 | B1 | 8/2017 | Schultz et al. |
| 10,108,773 | B1* | 10/2018 | Gasparyan ............ G06F 30/398 |
| 2020/0057963 | A1* | 2/2020 | Lekivetz ................ G06F 17/16 |

OTHER PUBLICATIONS

Xilinx, Alveo Data Center Accelerator Card Platforms, User Guide, UG1120 (v1.3) Jan. 13, 2021, 35 pages.

* cited by examiner

```
/lib/firmware/xilinx/  # this is the 'machine readable' directory accessed by the runtime engine
  |
  +-<logic_uuid>  # main install directory for RPM where package files from the partition package are unpacked
  |  |
  |  +- partition.<fpga configuration file>  # .mcs for BLP, .bit for PLP
  |  +- partition_metadata.json
  |  +- partition.xsabin  # generated at RPM install time by running create_xsabin.sh
  |  +- create_xsabin.sh
  |  +- create_xsabin.log  # generated at RPM install time, contains output of running create_ssabin.sh
  |  |
  |  +- license  # contains copyright and licensing information
  |       |
  |       +- COPYRIGHT
  |       +- LICENSE
  |
  +- <interface_uuid_0>  # symbolic link to <logic_uuid> directory within /lib/firmware/xilinx
  +- <interface_uuid_1>  # symbolic link to <logic_uuid> directory within /lib/firmware/xilinx
```

FIG. 5

```
/opt/xilinx/firmware/
 |
 +-<card_name>   # this directory and all subdirectories are for human interactive access
 |
 +- <partition_family_name>
    |
    +-<partition_name>
       |
       +- partition.xsabin        # symbolic link to /lib/firware/xilinx/<logic_uuid>/partition.xsabin
       +- partition.metadata.json # symbolic link to /lib/firmware/xilinx/<logic_uuid>/partition.metadata.json
       |
       +- scripts
       |  |
       |  +- create_xsabin.sh  # symbolic link to /lib/firmware/xilinx/<logic_uuid>/create_xsabin.sh
       |  +- create_xsabin.log # symbolic link to /lib/firmware/xilinx/<logic_uuid>/create_xsabin.log
       |
       +- firmware  # this subdirectory only exists if the partition has a firmware dependency
       |  |
       |  +- <firmware_products>-<firmware_branch_id>  # symbolic link to firmware used in /opt/xilinx/
firmware/<firmware_prodcut>/<firmware_brandk_id>
       |  +- <firmware_products>-<firmware_branch_id>  # same as above, for each firmware used by partition
       |
       +- test
       |  |
       |  +- verify.xclbin
       |  +- bandwidth.xclbin
       |
       +- licsense  # symbolic link to /lib/firmware/xilinx/<logic_uuid>/license
```

FIG. 6

```
"ep_ert_sched_00":{
  "pcie_physical_function" : "0x1",
  "pcie_base_address_register" : "0x0",
  "range" : "0x0000000000010000",
  "offset" : "0x0000000000010000", "register_abstraction_name" :
"xilinx.com:reg_abs:shell_utils_embedded_scheduler_hw:1.0",
  "interrupt_alias" : [
     "interrupt_cu_bank_00",
     "interrupt_cu_bank_01",
     "interrupt_cu_bank_02",
     "interrupt_cu_bank_03",
  ]
},
```

FIG. 9

FLEXIBLE DATA-DRIVEN SOFTWARE CONTROL OF RECONFIGURABLE PLATFORMS

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to data-driven software control of reconfigurable platforms implemented using one or more integrated circuits (ICs).

BACKGROUND

Modern computing environments often include a host computer coupled to one or more accelerators. The accelerator may be implemented as a card that is installed within, or communicatively linked to, the host computer. The accelerator is capable of performing operations offloaded from the host computer. When an operation is offloaded from the host computer to the accelerator, the accelerator performs the operation rather than the central processing unit of the host computer. Results generated by the accelerator may then be made available to the host computer. The accelerator is capable of providing one or more benefits such as, for example, faster operation, reduced power consumption, and/or redundancy, over computing environments that do not use accelerator(s).

SUMMARY

A method can include determining, by a host computer, an interface universally unique identifier (UUID) of an interface of platform circuitry implemented on an accelerator, wherein the accelerator is communicatively linked to the host computer, and receiving, by the host computer, an electronic request to run a partition design on the accelerator. The method can include, in response to the electronic request, determining, by the host computer, an interface UUID for an interface of the partition design. The method also can include determining compatibility of the partition design with the platform circuitry based on a comparison of the interface UUID of the partition design with the interface UUID of the platform circuitry. The method can include implementing the partition design within the accelerator in response to determining that the partition design is compatible with the platform circuitry.

A system includes a processor configured to initiate operations. The operations can include determining an interface UUID of an interface of platform circuitry implemented on an accelerator, wherein the accelerator is communicatively linked to the system, and receiving an electronic request to run a partition design within the accelerator. The operations can include, in response to the electronic request, determining an interface UUID for an interface of the partition design. The operations also may include determining compatibility of the partition design with the platform circuitry based on a comparison of the interface UUID of the partition design with the interface UUID of the platform circuitry. The operations can include implementing the partition design on the accelerator in response to determining that the partition design is compatible with the platform circuitry.

A computer program product includes one or more computer-readable storage media, and program instructions collectively stored on the one or more computer-readable storage media. The program instructions are executable by computer hardware to initiate operations. The operations can include determining an interface UUID of an interface of platform circuitry implemented on an accelerator, wherein the accelerator is communicatively linked to the computer hardware, and receiving an electronic request to run a partition design on the accelerator. The operations can include, in response to the electronic request, determining an interface UUID for an interface of the partition design. The operations also may include determining compatibility of the partition design with the platform circuitry based on a comparison of the interface UUID of the partition design with the interface UUID of the platform circuitry. The operations can include implementing the partition design on the accelerator in response to determining that the partition design is compatible with the platform circuitry.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 5 illustrates an example of a machine-readable directory structure created within a host computer in response to installation of a partition installer package.

FIG. 6 illustrates an example of a human-readable directory structure created within a host computer in response to installation of a partition installer package.

FIG. 9 illustrates an example digest for an addressable endpoint of a partition design.

DETAILED DESCRIPTION

This disclosure relates to data driven software control of reconfigurable hardware platforms. In accordance with the inventive arrangements described within this disclosure, a host computer is capable of controlling operation of a reconfigurable hardware platform implemented by an accelerator. The accelerator may include an integrated circuit (IC). The IC may be a programmable IC that realizes the reconfigurable hardware platform. The reconfigurable hardware platform may be implemented based on a hierarchical framework for an electronic system, referred to as a chassis. The chassis defines and enforces a contract for interfaces between partition designs implemented in adjacent partitions in the IC.

The host computer uses a data-driven approach for managing partition deployment for the chassis. The host computer is capable of controlling implementation of different partition designs developed using the chassis, in part, based on partition design data installed within the host computer itself. Different partition designs may be installed on the host computer and, once installed, are available for implementation on the accelerator coupled to the host computer. Installation of a partition installer package, corresponding to a partition design, on the host computer generates one or more data structures used by the host computer for managing implementation of the partition design on the accelerator.

In another aspect, the host computer is capable of dynamically configuring the accelerator to implement different partition designs therein in real time. For example, the host computer may implement different partition designs in real time in response to electronic requests to do so. The requests may be from a system administrator, an application executing in the host computer, or other source. The enforcement of the contract among partition designs implemented in conformance with the chassis means that the partition designs may be developed completely independently of one another with guaranteed compatibility. By enforcing the contract, the partition designs utilize consistent interfaces among one another thereby supporting inter-partition operability. Further, the host computer is capable of dynamically discovering capabilities of partition designs installed in the host computer itself and/or partition designs that have been implemented on the accelerator.

Figure 1:
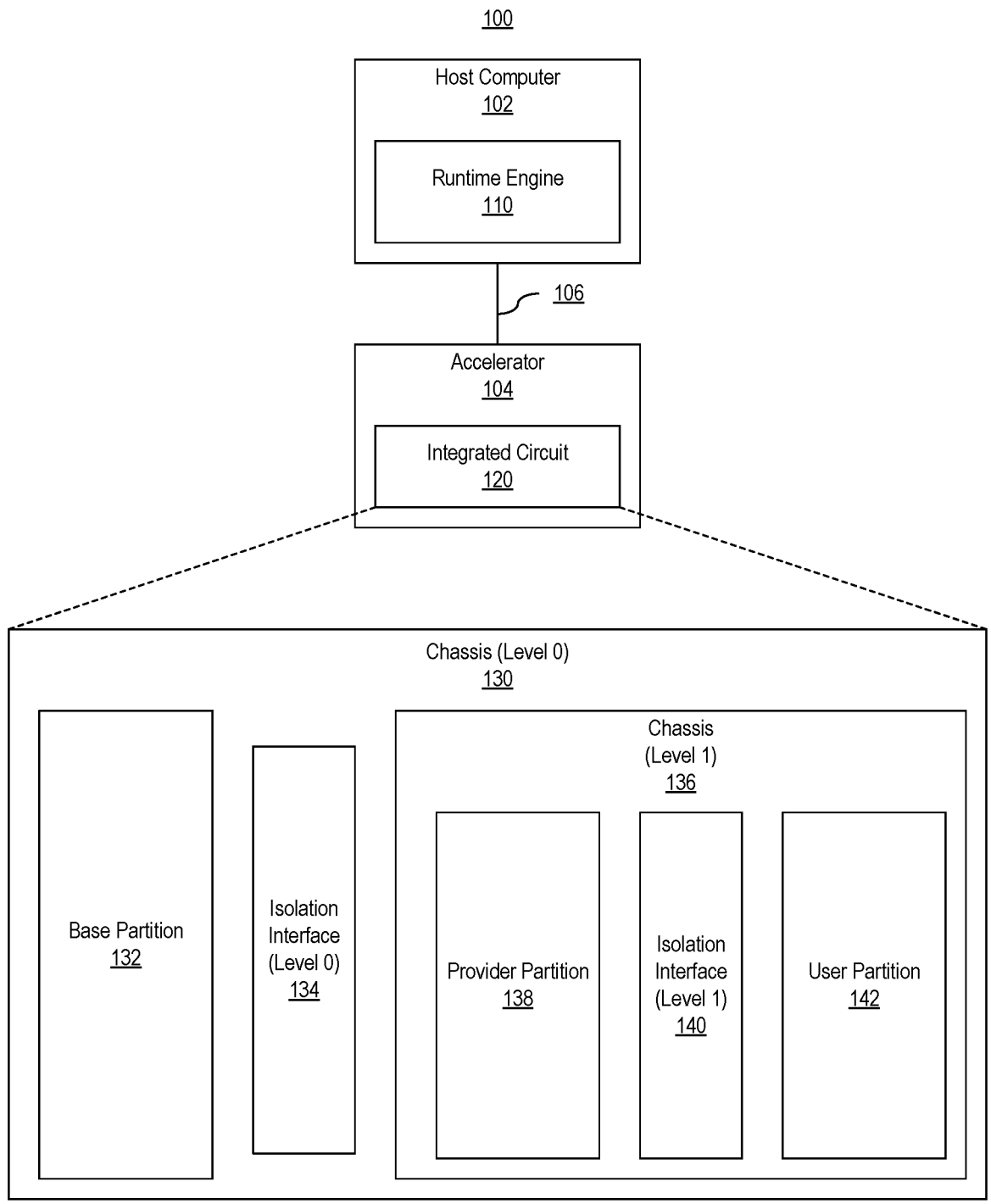
FIG. 1 illustrates an example implementation of a computing environment having a host computer communicatively linked with an accelerator.

FIG. 1 illustrates an example computing environment 100. Computing environment 100 includes a host computer 102 communicatively linked to an accelerator 104 via a communication link 106. An example implementation of computing environment 100 is described in greater detail in connection with FIG. 11. In the example of FIG. 1, host computer 102 includes and executes a runtime engine 110. Runtime engine 110 is implemented as instructions, e.g., program code, that is executable by a processor included in host computer 102. Runtime engine 110, upon execution, is capable of managing the various aspects of partition design deployment, discovery, and implementation described herein with respect to accelerator 104.

Integrated circuit (IC) 120 is disposed on accelerator 104. In one aspect, IC 120 includes at least some programmable circuitry. The programmable circuitry may include programmable logic. As an illustrative and non-limiting example, IC 120 may be implemented as a field programmable gate array (FGPA), as a System-on-Chip having at least some programmable circuitry, or as an Application-Specific Integrated Circuit (ASIC) including at least some programmable circuitry.

IC 120 is capable of implementing a reconfigurable platform shown as chassis 130. Chassis 130 implements a hierarchical framework in which various partition designs may be implemented dynamically and in real time under control of runtime engine 110. In general, chassis 130 formalizes and enforces an inter-partition contract defining connectivity and interaction between partition designs implemented therein. As defined within this disclosure, the term "chassis" means a hierarchical framework for an electronic system implemented in an IC. A chassis includes one or more floorplanned regions of circuitry referred to as "partitions." In one aspect, a partition refers to a particular region, e.g., a floorplanned region, of programmable circuitry also known as a reconfigurable region. Partition designs may be implemented in, or in conformance with, the partitions of the chassis. In addition to the partitions, a chassis includes one or more particular isolation interfaces (e.g., Intellectual Properties or "IPs"). In some cases, the chassis further includes at least one partition design implemented in one of the partitions. As defined within this disclosure, the term "subsystem" means a partition design or another chassis referred to as a sub-chassis. Each sub-chassis may include one or more further partitions in which one or more sub-chassis and/or one or more partition designs may be implemented.

The term "partition design" means a circuit design that may be implemented in a partition of, or in conformance with, a chassis. In general, a partition design is a circuit design that has been synthesized, placed, and routed. In one aspect, a partition design may be specified as configuration data, e.g., a configuration bitstream or a partial configuration bitstream, that is loadable within IC 120 to implement specific circuitry in a particular partition. As used within this disclosure, the term "implement," whether in reference to accelerator 104 or IC 120, refers to loading configuration data of a partition design into IC 120 such that the partition design is physically realized in the programmable platform provided by accelerator 104 and IC 120. A partition design that is running on accelerator 104 is one that has been implemented in IC 120 and is capable of operating to perform tasks offloaded from host computer 102.

As defined herein, the term "Intellectual Property" or "IP" means a pre-designed and reusable unit of logic, cell, or chip layout design in the field of electronic circuit design. An IP, sometimes referred to as a "core," may be expressed as a data structure specifying a description of circuitry that performs a particular function. An IP can be expressed using hardware description language file(s), as a netlist, as a configuration bitstream that programs at least a portion of a programmable IC, or the like. An IP may be used as a building block within circuit designs adapted for implementation within various types of ICs.

In general, a chassis may include a base partition. In the example of FIG. 1, chassis 130 includes base partition 132. As defined within this disclosure, the term "base partition" means a partition that is configured responsive to a boot condition. A boot condition may be triggered in response to a power on condition or a reset condition for accelerator 104 and/or IC 120. The base partition may be configured (e.g., partially reconfigured) to implement a base partition design.

In one aspect, base partition 132 may be implemented as a static region of circuitry. A static region of circuitry refers to a region of programmable circuitry that, while reconfigurable, in general, does not change over time. The static region of circuitry may include one or more hardwired circuit blocks that operate in cooperation with circuitry implemented in programmable circuitry. For example, base partition 132 may be used to implement infrastructure circuitry for accelerator 104 to communicate with host computer 102 and provide hardware support for one or more kernels (e.g., user circuitry). For purposes of illustration, base partition 132 may be used to implement a base partition design specifying circuitry such as a Peripheral Component Interconnect Express (PCIe) endpoint, communication channel management circuitry, and/or card control and status monitoring circuitry.

Other partitions such as provider partition 138 and/or user partition 142 may be implemented as dynamic regions. A dynamic region refers to a region of programmable circuitry that generally implement different partition designs over time. Partitions 138 and/or 142, for example, may be reconfigured, e.g., by way of partial reconfiguration, to implement different partition designs over time without interrupting operation of any base partition design implemented in base partition 132. In an example implementation, provider partition 138 may implement application data plane management circuitry while user partition 142 may implement one or more compute kernels (e.g., user circuitry). The compute kernels consume the data plane resources of accelerator 104 under the governance of runtime engine 110.

In the example of FIG. 1, chassis 130 includes an isolation interface 134 that may be used to couple base partition 132 with a chassis 136. That is, base partition 132 is implemented to conform to the inter-partition contract implemented by isolation interface 134. In general, each isolation interface of a chassis embodies the contract between adjacent partitions. The contract may be realized by the partition designs implemented in the adjacent partitions that communicate with one another via the isolation interface. The contract may specify both physical and logical requirements for partitions. As defined within this disclosure, the term "contract" means a technical specification defining a physical and/or a logical interface between partitions. Accordingly, any partition design intended for implementation in a given partition must conform with the contract or contracts relevant to the destination partition.

Chassis 136 is an example of a sub-chassis. The hierarchical relationship between chassis 130 and chassis 136 is illustrated via the level indications where chassis 130 is level 0 or a top-level chassis while chassis 136 is level 1 and, as such, one level below that of chassis 130. Isolation interface 134, also of level 0, belongs to chassis 130. Chassis 136 includes provider partition 138, isolation interface 140, and user partition 142. In this regard, isolation interface 140, belonging to level 1, may be said to belong to chassis 136.

In the example, provider partition 138 is configured to couple to isolation interface 134 and to isolation interface 140. That is, a partition design to be implemented in provider partition 138 must conform to the inter-partition contract defined by isolation interface 134 and the inter-partition contract defined by isolation interface 140. Isolation interface 140 couples provider partition 138 to user partition 142. Any partition design to be implemented in user partition 142 must conform to isolation interface 140.

Each partition of a chassis is aligned, e.g., conforms to, to an interface specification implemented by an isolation interface. By conforming any partition designs intended for implementation in such partitions to the relevant interface specification, each partition design may be "plugged-in" or implemented within one of the predetermined partitions of the chassis. While base partition 132 may be used to implement certain infrastructure, other partitions may be used to implement the majority or bulk of the application functionality within IC 120.

The hierarchy illustrated in the example of FIG. 1 is provided for purposes of illustration and not limitation. It should be appreciated that other arrangements of partitions, isolation interfaces, and sub-chassis may be used to implement a chassis using IC 120. Using an established chassis with enforceable inter-partition contracts allows different partition designs to be developed by different groups and/or entities concurrently and independently of one another while ensuring that the partition designs will inter-operate within the chassis as intended.

The configurable hardware platform (referred to herein as "platform") described in connection with FIG. 1 allows partition designs to be delivered as multiple layers of swappable subsystems. As such, an application developer and/or accelerator datacenter operator may select a particular combination of partition designs that most efficiently implement a desired application. This also means that the partition designs implemented in IC 120 that effectuate a particular hardware solution may change rapidly over time.

Regarding host computer 102, runtime engine 110 is capable of dynamically discovering the capabilities of the set of partition designs installed on host computer 102 and/or partition designs running on to accelerator 104. Runtime engine 110 is capable of adapting operation thereof to offer a broad range of hardware resources to an end user and efficiently configure partitions of accelerator 104 (or a plurality of such accelerators). Runtime engine 110 further is capable of robustly controlling the features of partition designs running on accelerator 104. In cases where a system administrator or an end user instructs runtime engine 110 to reconfigure one or more of the partitions of IC 120, runtime engine 110 is capable of doing so in a fluid manner.

Within this disclosure, the term "deploy," when used in the context of deploying a partition design, refers to the general process of making the partition design available for use by an accelerator. For example, deploying a partition design may include organizing partition design files (e.g., configuration data and metadata) into partition installer packages, defining how those partition installer packages relate to each other, defining how the partition installer packages are installed on the host computer for use by runtime engine 110, and defining how the partition designs are implemented by and run on the accelerator.

A design process using the platform of FIG. 1 may begin with a user (e.g., a platform architect) defining the one or more chassis levels of the platform. This process may include mapping application requirements to the floorplan of accelerator 104, allocating sufficient programmable circuitry resources to the partitions, and planning and delivering the interface specifications to users performing partition design. Partition designers may then work concurrently on their respective partition designs. Partition designs may undergo an implementation flow (e.g., synthesis, placement, routing, and/or bitstream generation) resulting in several partitions that may be installed in host computer 102 and/or implemented on accelerator 104.

The implementation flows align the processes to the necessary chassis definitions so that the resulting output, e.g., placed and routed partition designs, are assured to interoperate correctly when implemented in IC 120. Each partition design may be tested and encapsulated into a partition installer package that can be provided to end users. Users may install the partition installer package on their host computers and implement the partition designs on their accelerators via the runtime engine.

Figure 2:
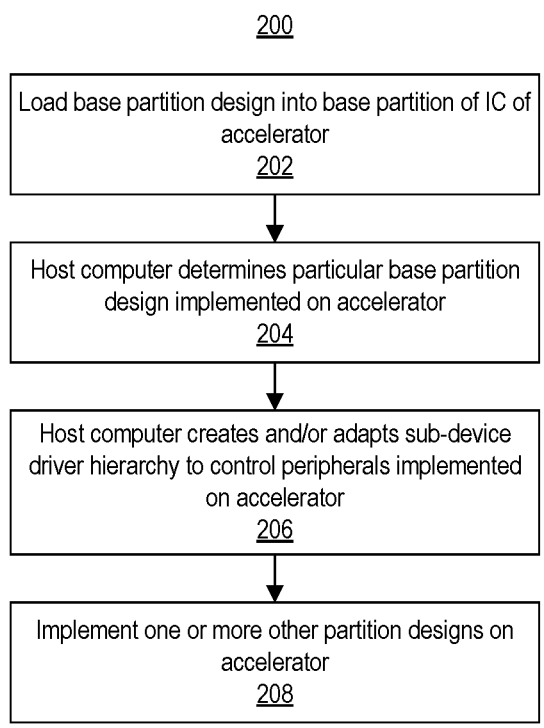
FIG. 2 illustrates an example method of managing an accelerator.

FIG. 2 illustrates an example method 200 of managing an acceleration card. More particularly, the example of FIG. 2 illustrates a process of booting an accelerator 104 of computing environment 100 in response to a reset condition or a power on condition. Accordingly, method 200 may begin in a state where accelerator 104 is reset or powered on from an off state.

In block 202, a base partition design for base partition 132 is loaded into IC 120. Accelerator 104 may include a non-volatile memory (e.g., non-volatile memory 1124 of FIG. 11) in which the base partition design may be stored. In response to powering on or a reset, IC 120 reads the base partition design from the non-volatile memory and loads base partition design into configuration memory therein. This action implements the circuitry specified by the base partition design within base partition 132 within IC 120. While IC 120 is being configured, host computer 102 may also implement a boot process and perform operating system tasks such as discovering the physical hardware configuration of the host computer 102 (e.g., determining that host computer 102 is coupled to accelerator 104). The boot process of host computer 102 may also include initialization of chipset level device drivers and application-level drivers such as those that may be included as part of runtime engine 110 to discover and communicate with accelerator 104. The application-level drivers provided by runtime engine 110 may be bound to accelerator 104.

In block 204, host computer 102 determines the particular base partition design implemented on accelerator 104. In one aspect, host computer 102 is capable of reading an attribute from the base partition design as implemented in base partition 132. Since there may be many different variations of base partition designs available, the attribute read from IC 120 must be able to distinguish the base partition design implemented in base partition 132 from other variations of such base partition design. In one aspect, the attribute may be stored in a memory or register at a predetermined address within base partition 132 or elsewhere in IC 120.

In one aspect, the attribute read from IC 120 is a cryptographic hash referred to as a universally unique identifier or "UUID." The UUID for a partition design may be generated by processing a post-routed version of the partition design through a cryptographic hashing function to generate the cryptographic hash. A suitably robust cryptographic hashing function having sufficient precision and sensitivity may be used so that the chance of two distinct partition designs resulting in a same hash value is so small as to be effectively negligible. One example of a suitable cryptographic hashing function is the 128-bit MD5 checksum. It should be appreciated, however, that other cryptographic hashing functions may be used such as SHA and/or stronger cryptographic hashing functions. The UUID, once generated, may be embedded in the partition design so that the UUID may be read by host computer 102 from the partition design as implemented in IC 120. As such, the UUID may be pre-generated and embedded in the partition design prior to deployment of the partition design to accelerator card 104.

In the example of FIG. 2, the UUID used is a "logic UUID." The UUID is referred to as a logic UUID since the UUID is generated by computing a cryptographic hash of the post-routed logic netlist of the partition design. In general, a UUID, as used within this disclosure, is generated as an encrypted hash of some portion or all of design data for a partition design. The design data may be post routing. In the case of a logic UUID, the design data is the post-routed logic netlist of the partition design. Generating a logic UUID in this manner ensures that repeated implementation of a partition design with no change in input sources (e.g., design files) or physical design tools (e.g., design tools themselves and/or settings thereof) results in partition designs having the same logic UUID. The data used to generate the UUID is time invariant.

Other techniques for generating identifiers for partition designs typically rely on product names, software release names, or other textual identifiers including timestamps that change over time. These types of identifiers may be deficient in that two partition designs generated at different times, for example, may have different identifiers despite the partition designs being identical in terms of post-routed logic netlists. These sorts of textual identifiers are unhelpful in that variations in the identifiers make the partition designs appear as two different partition designs when, in fact, the post-routed logical netlist of the two partition designs may be identical.

In block 206, host computer 102 creates and/or adapts a sub-device driver hierarchy to control peripherals implemented in IC 120. In one aspect, a partition installer package may be installed on host computer 102 for each partition design that may be run on accelerator 104. Installation of the partition installer package for the base partition design creates a data structure specifying metadata for the base partition (or any other partition) to be described herein in greater detail. The metadata describes the various capabilities of the partition design.

As such, host computer 102 is capable of dynamically discovering the capabilities of the base partition design, or any other installed partition design, by reading the metadata contained in the data structure for the base partition design and loading any necessary sub-device drivers for peripherals (e.g., addressable endpoints) implemented by the base partition design as specified by the metadata therefor. In one aspect, the data structure for the base partition design or other partition design may be located by runtime engine 110 using the logic UUID read from IC 120.

In block 208, host computer 102 is capable of implementing one or more other partition designs on accelerator 104. In one aspect, host computer 102 is capable of determining one or more other partition designs that may be implemented within chassis 130 that are able to connect to base partition 132 based on the inter-partition contract of chassis 130 as implemented by isolation interface 134.

The logic UUID described in connection with FIG. 2 provides a stable basis for partition design identification. The inventive arrangements described within this disclosure support an architecture where multiple different partition designs may be loaded into a same partition of a chassis. This situation may arise for any of a variety of different reasons.

In one example, an earlier version of a partition design may be superseded by a newer version of the partition design that is functionally equivalent to the superseded version of the partition design. The newer version of the partition design may improve on some metric of quality. The improvement may be fewer known bugs, reduced power consumption, or improved performance. In another example, two or more partition designs may implement differing subsets of the overall range of possible partition design functionality. For example, a first version of a partition design may implement full functionality while a second version of the partition design may be created where some features are disabled or removed to allow a richer set of debug and triage features to be included or enabled. In another example, a first version of a partition design may implement common features for a given application domain while a second version of the partition design may implement an extended range of functionality for the application domain.

Runtime engine 110 is capable of checking interoperability of available partition designs before allowing any partition design to be implemented or run on accelerator 104. In response to determining that a partition design is not compatible, e.g., determining that interoperability between a given set of partition designs is not established, runtime engine 110 is capable of preventing implementation of any incompatible partition designs on accelerator 104 to prevent a fault condition. A fault condition may render accelerator 104 inoperable such that privileged administrator maintenance (e.g., human intervention or other actions) are required to recover accelerator 104 to correct operation.

Using a chassis as described herein allows the chassis design process to be performed independently of the partition design process. During the chassis design process, the contract between partitions of the chassis is established. The contract specifies aspects of the partition interface including, but not limited to, signal exchange, timing budgets, and other system-level aspects of communication between the partitions. The contract may specify physical signal exchange characteristics, logical characteristics, and system-level characteristics that may be considered when determining compatibility among partitions. A deviation in any one or more of the physical, logical, or system-level characteristics may result in either incorrect operation or degraded performance of the set of partition designs intended to interoperate for a given chassis.

The use of enforceable contacts for inter-partition boundaries, while ensuring interoperability of partition designs, also enables forward interoperability of partitions designs. In conventional platform solutions, a change in one partition often triggers a requirement to rebuild the partition design of each other adjacent partition. Such was the case because holding the inter-partition boundary stable was not feasible. In accordance with the inventive arrangements described herein, the inter-partition boundary is maintained as stable and is guaranteed to be consistent between successive partition designs implemented in adjacent partitions of a chassis. In addition to inter-partition communication, device input/output (I/O) interactions between a partition and the accelerator and/or other devices external to IC 120 may also be considered. As noted, logic UUIDs may be generated from design data such as the post-routing logical netlist of partition designs. Another type of UUID, referred to as an "interface UUID," may be used that relates to interfaces.

An isolation interface, as generally discussed in connection with FIG. 1, may be specified as an IP referred to as an "isolation interface IP." The isolation interface IP encapsulates the contract implemented by the interface(s) that exist between adjacent partitions. The isolation interface IP may include multiple portions referred to herein as "modes." A "pipe" mode of the isolation interface IP may specify the active circuitry that is capable of holding an inter-partition boundary in a predetermined or safe state while a partition of the chassis is reconfigured to implement a different partition design therein. In this regard, the pipe mode may specify physical characteristics of the isolation interface. The physical characteristics may include, but are not limited to, the exact set of signals of the isolation interface, widths of the signals, directions of the signals, etc. The pipe mode also includes system-level metadata like the "wire" mode described below.

A "wire" mode of the isolation interface IP, unlike the pipe mode, contains no active logic. Both the wire mode and the pipe mode carry system-level metadata. The wire mode functions as a design metadata container (e.g., a data structure that stores metadata). The wire mode, for example, may specify logical and system-level characteristics of the isolation interface. Logical characteristics may include, but are not limited to, pipelining, default signaling, and the like. System-level aspects may include, but are not limited to, qualitative attributes of communication. The metadata, whether specified within the metadata container of the wire mode or within the pipe mode as described below, is readable by a computer system.

For purposes of illustration, consider an example of an isolation interface IP that includes a bundle of signals conforming to a particular configuration of an Advanced Microcontroller Bus Architecture (AMBA) eXtensible Interface (AXI) (hereafter "AXI") compliant interface. AXI defines an embedded microcontroller bus interface for use in establishing on-chip connections between compliant circuit blocks and/or systems. The pipe mode isolation interface specifies the physical circuitry and signals that become locked down as part of the logic design in the chassis. The pipe mode of the isolation interface IP guarantees that the signaling of the AXI interface will be consistent between the two adjacent partitions.

The wire mode of the isolation interface IP carries additional metadata for each of the interfaces contained by the isolation interface IP. For example, the AXI interface signal bundle may be presented to the designer as one or more interface objects that Electronic Design Automation (EDA) tools are capable of querying for functional and/or qualitative characteristics such as the maximum number of transaction threads the AXI interface supports, the number of pipelined transactions that can be sustained over the interface before the interface stalls, or other data. In one aspect, the metadata is present or included in both the pipe mode and the wire mode of each isolation interface IP instance and facilitates design automation in the partition design implementation flow to automate the configuration of subsystems in the partition design to match the operating characteristics of the interface(s) on the isolation interface IP. In addition, system address map information also may be annotated into the interface objects of the isolation interfaces so that partitions broadly agree on which memory apertures are available on which interfaces between the partitions.

In one aspect, EDA tools are capable of implementing a chassis as part of workflow in advance of any actual partition designs. The EDA tools may include one or more isolation interface IPs. The training logic is capable mimicking a range of partition designs that may reside within the partitions of the chassis being developed. The training logic and the isolation interface IP instances included in the chassis are sufficiently complete and/or detailed so that the EDA tools may complete an implementation flow to complete a physical implementation process for the chassis.

In an example implementation, a chassis contains logic cells of the pipe mode of the isolation interface IPs and training logic. The pipe mode and the training logic may be used by the EDA tools as a guide to retain signaling and timing closure characteristics between the partitions joined by the isolation interface IP during the partition design process (e.g., the process of creating a partition design for a partition of the chassis). In another example implementation, the logic cells of both the pipe mode and the training logic may be retained in the chassis and may be included in configuration data that is ultimately downloaded to IC 120.

The cells of the pipe mode have a functional role in operation of the platform. The cells of the pipe mode hold the inter-partition signaling in a known state during reconfiguration of the partition. The training logic does not typically have any functional role in the design. In some cases, however, the training logic may be capable of implementing simple test stub functionality.

While the logic cells of the chassis are not typically implemented in a "chassis" configuration bitstream, e.g., configuration data specific for the chassis, the design netlist of the chassis is provided to the EDA tools performing the partition design implementation processes so that the partition designs merge their logic into the netlist of the chassis design. The resulting implemented partition designs may contain the common, overlapping sections of the chassis logic design to retain correct operation of the overall platform during reconfiguration of IC 120.

The EDA tools are capable of analyzing the chassis and generating an interface UUID for each isolation interface IP contained in the chassis. In one aspect, the EDA tools are capable of extracting the implemented sub-design of the isolation interface IP as a post-routed netlist. This netlist contains the physical device resources that are allocated to the isolation interface IP. The netlist further includes any allocated routing segments and terminal points that must be exactly, physically aligned across the partition boundary. This partial post-routed netlist, e.g., for the isolation interface IP, contains a precise definition of the physical compatibility of the inter-partition interface. The EDA tools are capable of generating a cryptographic hash, as previously described, from the post-routed netlist of the isolation interface IP to generate an interface UUID. The post-routed netlist may be a binary file. The interface UUID is a unique identifier that encompasses the interoperability characteristics of the inter-partition interface. Like the logic UUID, the interface UUID is generated from time-invariant design data.

The interface UUID of an isolation interface specifies sufficient detail to determine physical compatibility of the interface. Functional aspects of the inter-partition contract may be specified as system-level metadata for the interface. The system-level metadata may specify information including, but not limited to, types of transactions exchanged through the interface and supported between adjacent partitions and any constraints on such transactions. This type of information may not be determinable from the physical signal set passing between the partitions. For example, the system-level metadata may specify runtime values that that are transported across the signal set of an interface. Correct alignment of physical signals and system-level metadata allows partition designs to be optimized and made more robust by the advance knowledge of runtime feature constraints.

Accordingly, in one aspect, each isolation interface IP may be a container that includes a complete set of system-level metadata. System-level metadata encapsulated within an isolation interface IP may be applied and preserved during partition design and/or a chassis implementation flow. During an implementation flow, the isolation interface IP passes the representation of the system-level metadata therein into the physical implementation flow performed by the EDA tools. In one aspect, this may be performed by using distinct property annotations on the netlist representation of the isolation interface. These property annotations may be preserved by the EDA tools from the point of initial elaboration in the implementation flow netlist data model and retained through creation of the post-routed netlist.

As such, since the post-routed netlist of an isolation interface IP is extracted and processed to compute the interface UUID by the EDA tools, the post-routed netlist already includes the system-level metadata, which forms the system-level contract between partitions. Accordingly, the system-level metadata contained in the post-routed netlist for the isolation interface is reduced to, and encapsulated by, the interface UUID. By retaining the descriptive system-level metadata as annotations on the physically implemented netlist, the metadata affects the outcome of the hashing process. As such, changes to the metadata will alter the interface UUID. The interface UUID is a smaller quantity of information to maintain through the remainder of the design process. Still, the interface UUID contains sufficient uniqueness and a direct correlation to the chassis design configuration used to produce the isolation interface.

The incorporation of a wire mode isolation interface in a partition design maintains a logical coupling between the interface UUID and the expected physical and logical contract at the partition boundary. Using the wire mode allows an implementation flow for a partition design to force the partition design to align to the full inter-partition contract. In performing an implementation flow for the partition design, the wire mode isolation interfaces enforce and couple the partition design to the isolation interface corresponding to the interface UUID by ensuring that the partition design conforms to the physical and logical constraints of the contract corresponding to the interface UUID.

Figure 3:
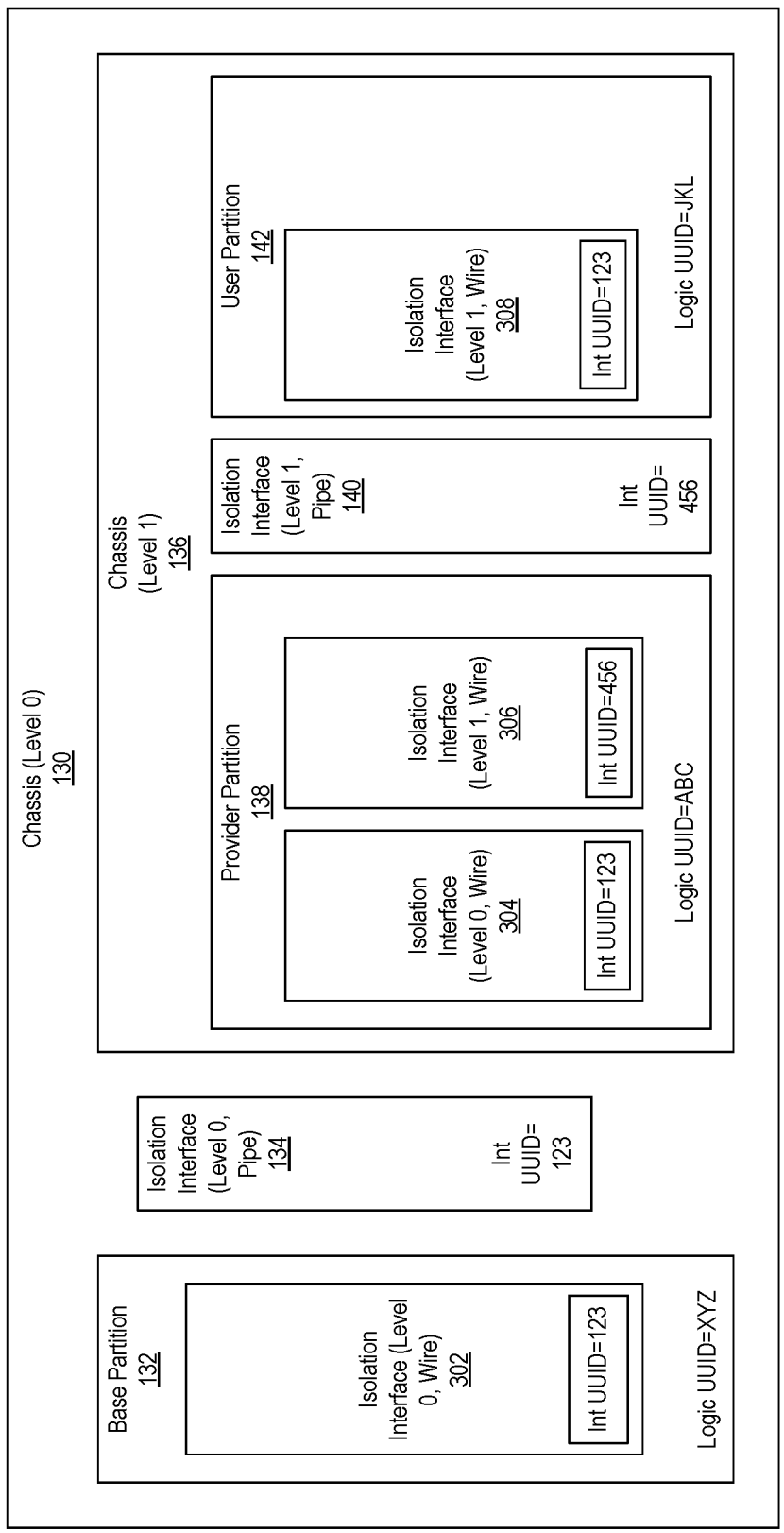
FIG. 3 illustrates an example of a chassis for use with implementing partition designs for use with an accelerator.

FIG. 3 illustrates another example of chassis 130 of FIG. 1 that demonstrates the role of logic UUIDs and interface UUIDs during the partition and chassis design processes. The design methodology described herein separates the chassis and partition designs into separate design projects. The example hierarchy shown in FIG. 3 is illustrative of the logical organization of the system implemented in IC 120 and not representative of a literal project structure.

In the example, base partition 132 and isolation interface 134 are children of chassis 130. Isolation interface 134 is the pipe mode of the isolation interface. Base partition 132 and the pipe mode of isolation interface 134 are siblings in terms of the hierarchy of chassis 130. Chassis 130 contains a sub-chassis shown as chassis 136.

Both base partition 132 and chassis 130 align to isolation interface 134. As shown, isolation interface 134 belongs to level 0 of the hierarchy corresponding to chassis 130. In the example, isolation interface 134 has an interface UUID (shown as "Int UUID" in FIG. 3) of "123." Both of the wire modes of isolation interfaces 302 and 304 align to the interface UUID of "123" in that the interface UUIDs of adjacent partitions match. That is, the interface UUID of a subsystem (e.g., a partition design or chassis) matches the interface UUID of an adjacent subsystem (e.g., another partition design or chassis).

In the design process for the base partition design intended for implementation in base partition 132, the base partition design may be aligned with chassis 130 and, in particular, isolation interface 134, by instantiating the wire mode of isolation interface 134 (e.g., shown as isolation interface 302) therein. The wire mode of the isolation interface operates as a design object when instantiated into the base partition design for base partition 132 and drives the partition boundary into physical and logical alignment with isolation interface 134. The interface UUID for the base partition design intended for base partition 132 may be preserved through the implementation flow implementing the base partition design.

The base partition design is created to include a logic UUID of "XYZ" embedded therein. As discussed in connection with the example of FIG. 2, the logic UUID of the base partition design implemented in base partition 132 may be read from IC 120 by host computer 102 as part of a boot process to identify the particular base partition design implemented in IC 120.

Similarly, during the implementation flow for the provider partition design intended for provider partition 138, the provider partition design may be aligned with chassis 130 and, in particular, isolation interface 134, by instantiating the wire mode version of isolation interface 134 (e.g., shown as isolation interface 304) therein.

A similar process may be implemented with respect to the design process for chassis 136. Chassis 136 may include its own interface UUID of "456" and include its own child partitions that align to interface UUID 456 by virtue of instantiation of the wire mode of isolation interfaces corresponding to isolation interface 140 within partition designs. For example, both of the wire modes of isolation interfaces 306 and 308 align to the interface UUID of "456." During the design process for the provider partition design for provider partition 138, the provider partition design may be aligned with chassis 136 and, in particular, isolation interface 140, by instantiating the wire modes of isolation interface 140 (e.g., shown as isolation interface 306) within the provider partition design. Similarly, during the design process for the user partition design intended for user partition 142, the user partition design may be aligned with chassis 136 and, in particular, isolation interface 140, by instantiating the wire mode of isolation interface 140 (e.g., shown as isolation interface 308) within the user partition design. The pair of isolation interface design objects (e.g., wire modes of isolation interfaces 306 and 308) drives the partition boundaries into physical and logical alignment with isolation interface 140. The interface UUIDs may be preserved through the implementation flows implementing the respective partition designs.

In the example of FIG. 3, the provider partition design for provider partition 138 has a logic UUID of "ABC." The user partition design for user partition 142 has a logic UUID of "JKL".

While logic UUIDs and interface UUIDs are usable during the design process as illustrated in connection with FIG. 3, it should be appreciated that host computer 102 may use logic UUIDs and/or interface UUIDs as part of a deployment strategy. More particularly, runtime engine 110 may utilize logic UUIDs and/or interface UUIDs as part of platform feature discovery.

Use of logic UUIDs and/or interface UUIDs facilitates partition design deployment by facilitating modularity in platforms implemented in programmable ICs. The modularity allows partition designs to be released asynchronously with respect to one another. Conventional platform deployment solutions take a different approach where platforms are released as large, monolithic designs. In consequence, platform updates occur infrequently. In accordance with the inventive arrangements described herein, partition designs for any of the various partitions of a chassis may be released independently of the others to end users, cloud providers, etc. Further, the inventive arrangements allow different variations in partition designs for a given partition to be released independently of one other. As a result, a user may mix and match partition designs to implement a desired system. A user may choose to upgrade parts of the platform on a schedule of their choosing with greater awareness and confidence in the scope of the change being applied.

By comparison, conventional platform deployment solutions required the rebuild and delivery of a much larger quantity of implemented design files (e.g., partitions designs). For the end user, a single, monolithic platform release often obscures the degree of change thereby making the decision to upgrade to a different platform more difficult since the effect of the upgrade on user (e.g., end user) partition designs may not be known. For example, a newly updated platform may include only one logical sub-unit that has changed, e.g., a small portion of a partition design, but be deployed as an entirely new platform. In consequence, despite only changing a small portion of the platform, the entire platform must undergo testing by the end user to verify functionality and that no unintended changes have been introduced into the new platform.

Figure 4:
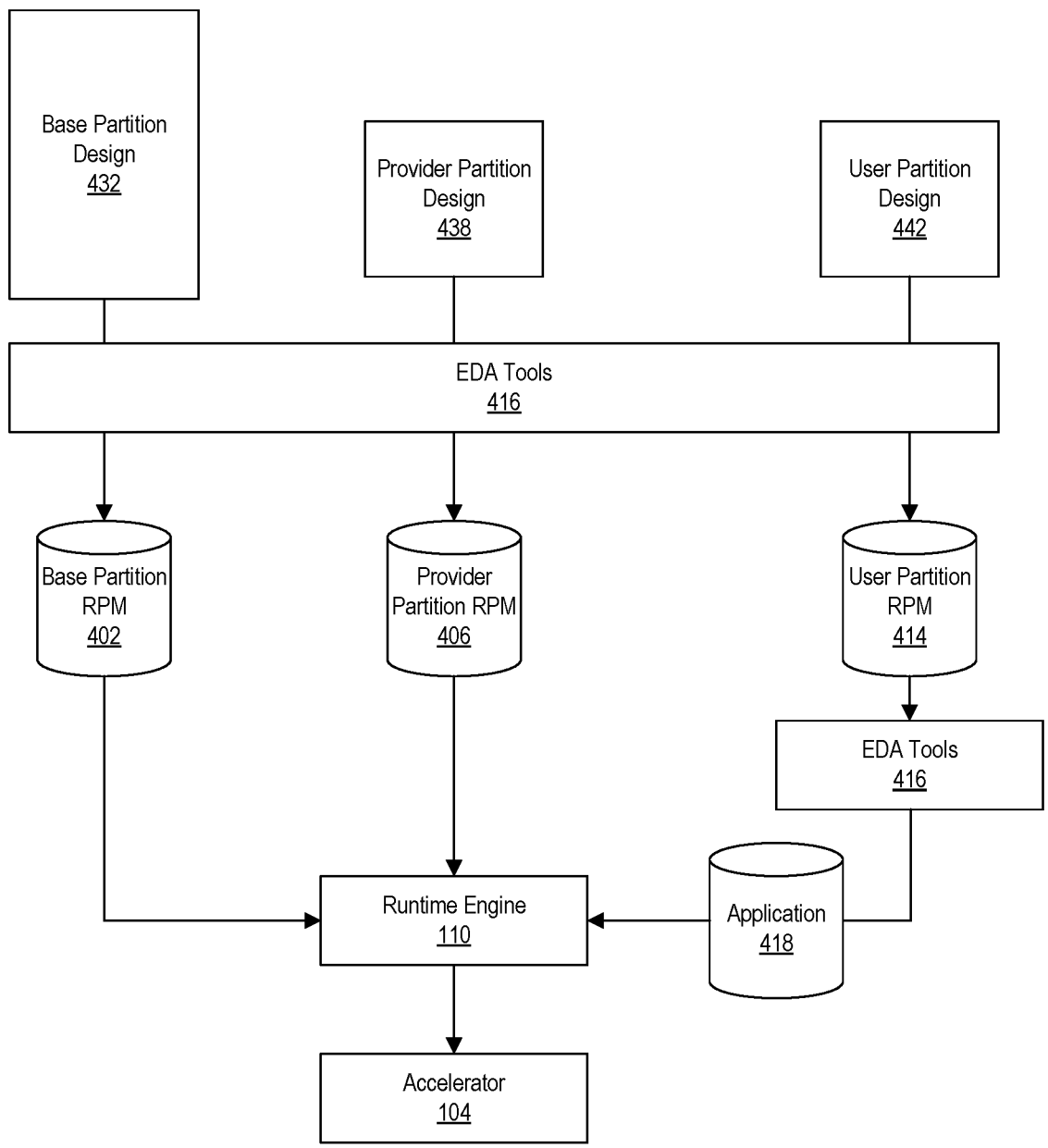
FIG. 4 illustrates modular deployment of partition designs by a host computer to an accelerator.

FIG. 4 illustrates modular deployment of partition designs by host computer 102 to accelerator 104. The example of FIG. 4 illustrates that each partition design may be processed by EDA tools into its own partition installer package. Accordingly, any changes to a delivered partition design may be limited to only the partition in which the partition design is intended to operate.

In the example of FIG. 4, base partition design 432 may be provided to runtime engine 110 as a partition installer package shown as base partition Red Hat Package Manager (RPM) 402. It should be appreciated that while the partition installer packages are shown as RPMs, other package management system file formats may be used in lieu of or in combination with RPM. Base partition RPM 402 is generated by the EDA tools. Provider partition design 438 may be provided to runtime engine 110 as another partition installer package shown as provider partition RPM 406. User partition design 442 may be processed and output by EDA tools 416 as a partition installer package shown as a user partition RPM 414.

In the example of FIG. 4, EDA tools 416 are capable of processing user partition RPM 414 to generate another version of user partition RPM 414 shown as Application 418. For example, user partition RPM 414 may not be a complete design that may be run on accelerator card 104. EDA tools 416 are capable of joining user partition RPM 414 with the customer's application logic, running synthesis and/or other implementation tools to produce application 418. Application 418 may include configuration data and metadata that runtime 110 is capable of running on accelerator card 104.

In the example of FIG. 4, runtime engine 110 is capable of downloading one or more or all of base partition design 432, provider partition design 438, and or user partition design 442 (e.g., the configuration data for the various designs) to accelerator 104 to be run thereon. In the context of deploying partition designs, logic UUIDs inform users of any differences between prior partition designs and newly deployed partition designs (e.g., partition installer packages). Interface UUIDs ensure confidence and trust that partition designs with same interface UUIDs will be interoperable and able to communicate through a common interface.

In one or more example implementations, partition installer packages may be deployed to host computer 102 using any of a variety of package management systems capable of tracking inter-package dependencies. Examples of such package management systems are available in different versions of the Linux operating system as enterprise package installation infrastructures with capabilities including network and/or cloud-based package distribution and acquisition. Linux is used for purposes of explanation and not limitation. As such, other types of package management systems also may be used. Package management systems may be used to manage processes such as acquiring, installing, upgrading, and/or uninstalling software packages including partition installer packages.

In one aspect, the UUIDs described herein may be mapped onto versioning namespaces utilized by a package management system. UUIDs (e.g., logic UUIDs and/or interface UUIDs) may be mapped onto the versioning namespace utilized by the package management system by transforming the UUID's into integer sequences that are compatible with data types commonly used in standard package management systems. In an example implementation, a dot separated integer sequence is created for a given partition based on the collection of interface UUIDs present in a chassis design for a given release. The dot separated integer sequence may be referred to as a chassis iteration sequence. Any time a fundamental property of the chassis changes, e.g., anytime an interface UUID changes, one or more elements in the chassis iteration sequence may be incremented. Similarly, the logic UUID may be used as a primary element in the formation of a build identifier. The mappings described make the chronological sequence of released partition installer packages sufficiently apparent to the package management system as to allow full reuse of installation and upgrade services of the package management system.

For purposes of illustration, consider an example where the partition installer packages are versioned with a dot-separated package version followed by a multi-digit integer representing the build number of the package. An example of a package name for a provider partition may be "xilinx-u250-gen3x16-xdma-shell-2.1-2961893.noarch.rpm." In this example, the number 2961893 is a mapping of the logic UUID (which may be a long hexadecimal sequence) to a shorter integer sequence. The changelist number of a revision control system may be used to provide the mapping. If the logic UUID were to change, the change is committed to the revision control system, which issues a new number to replace "2961893."

Continuing with the example, the package version number "2.1" may be taken from a source management convention. Each number in the package version number may represent a release of the interface UUIDs of the respective chassis. In this example, the level 0 chassis is mapped to "iteration number 2" because the chassis has been released once before with a different interface UUID. The level 1 chassis, being a child of the level 0 chassis, is mapped to "iteration number 1" indicating that this is the first time the interface UUID has been released as a child of the level 0 chassis. If the level 1 chassis were to change while the parent level 0 chassis remains unchanged, the package version number would be adjusted from "2.1" to "2.2."

A package management system provides standard services for managing the broad process of installation. The package management system generally does not specify how partition installer package contents are placed into host computer 102. Program code of the partition installer package, referred to as the installation program code, determines the particular manner in which the partition installer package is installed in host computer 102. Because both runtime engine 110 and users may interact with installed partition package data, the installation program code is capable of generating data structures that provide machine-readable directory structures and/or human-readable directory structures in host computer 102.

FIG. 5 illustrates an example of a machine-readable directory that is created as a data structure within host computer 102 in response to installation of a partition installer package. The example directory structure of FIG. 5 makes direct use of the UUIDs of the partition design to organize content. As such, partition installer packages, as installed on host computer 102, relate the configuration of any accelerator(s) 104 installed in host computer 102 to the set of installed partition installer packages.

As an illustrative example, in response to runtime engine 110 acquiring the logic UUID of a base partition design operating in IC 120, runtime engine 110 is capable of directly interrogating the machine-readable directory structure via the host file system to discover or determine information including (1) whether a partition installer package is presently installed in host computer 102 for accelerator 104 (e.g., for the base partition design) and (2) other details relating to operation of the base partition design. In some cases, for example, while the base partition design may be implemented in IC 120, the partition installer package for the base partition design may not be installed on host computer 102. The machine-readable directory structure illustrated in FIG. 5 allows runtime engine 110 to determine whether the partition installer package for the base partition design has been installed on host computer 102 by searching for a directory matching the logic UUID of the base partition design. If no directory corresponding to (e.g., matching) the logic UUID of the base partition design running on accelerator 104 is located, runtime engine 110 determines that the base partition design implemented in IC 120 is not installed on host computer 102.

Similarly, in response to runtime engine 110 being requested to implement a particular application on accelerator 104 (e.g., where the application in this context is a partition design or combination of two or more partition designs), runtime engine 110 is capable of determining the interface UUID of the application and further determine whether the interface UUID of the application is presently implemented or running on accelerator 104 (e.g., implemented in IC 120). In one aspect, runtime engine 110 may read such UUIDs of any partitions, whether logic UUIDs and/or interface UUIDs, from programmable IC 120. In another aspect, runtime engine 110 may read such UUIDs from a locally maintained data structure of host computer 102.

In response to determining that the interface UUID of the application is not configured on accelerator 104, runtime engine 110 is capable of performing a process referred to herein as "partition autoloading." Partition autoloading may include determining whether the interface UUID of the application has been installed on host computer 102. If installed on host computer 102, runtime engine 110 is capable of downloading the necessary partition design(s) that implement the interface UUID of the application to IC 120 in order to run the application on accelerator 104. In one aspect, file system symbolic links to the installation directories of the partition designs are used to implement interface UUIDs required by the application.

FIG. 6 illustrates an example of a human-readable directory that is created as a data structure within host computer 102 in response to installation of a partition installer package. The organization of the human-readable directory structure of FIG. 6 is structured. In one aspect, services such as scripts and the like may operate and interrogate the human-readable directory structure for installed partition installer packages. In one or more example implementations, the distinction between machine-readable and human-readable directories may arise as a balance between restricted coding environments that may only be accessible by operating system device drivers, management executables with elevated operating system privileges, or the like that are configured to operate on raw data views as compared to human beings and/or user-space utilities that are configured to operate on human-readable directory structures.

In one aspect, runtime engine 110 is capable of using file system services to minimize overhead and provide an additional layer of correlation between the two views which represent installation of the same set of partition design data files.

Figure 7:
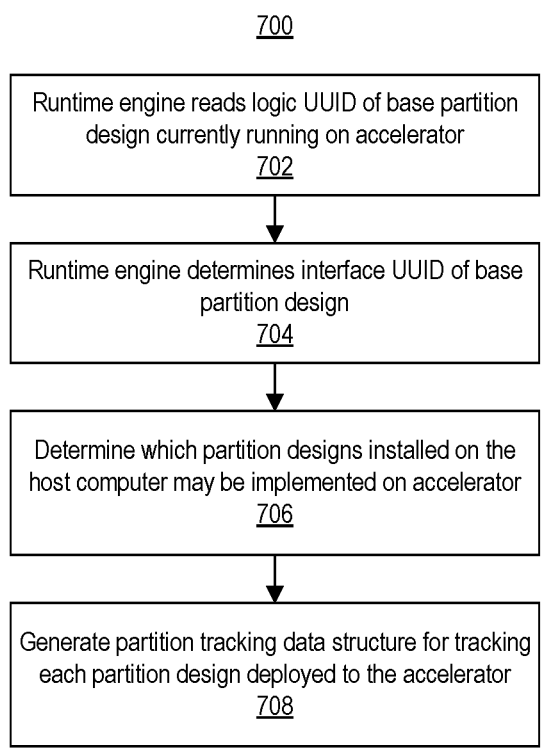
FIG. 7 illustrates an example method of partition design loading performed by a host computer executing a runtime engine.

FIG. 7 illustrates an example method 700 of partition design loading performed by host computer 102 executing runtime engine 110. In block 702, runtime engine 110 reads the logic UUID of the base partition design currently running on accelerator 104 (e.g., implemented in IC 120). In block 704, runtime engine 110 is capable of using the logic UUID of the base partition design obtained in block 702 to determine the interface UUID of the base partition design and/or any other PCIe attributes of the base partition design from metadata located in the installation directory for the base partition design as installed on host computer 102.

In block 706, runtime engine 110 is capable of determining which of the partition designs currently installed on host computer 102 may be implemented on accelerator 104. For example, as part of block 706, runtime engine 110 is capable of performing a discovery process that inspects the directories of installed partition designs (e.g., installed partition installer packages) to determine which partition designs installed on host computer 102 are compatible with the partition design(s) (e.g., the base partition design in this example) running on accelerator 104. Runtime engine 110 may identify those partition designs having interface UUIDs compatible with (e.g., matching) the interface UUID of the partition design(s) already running on accelerator 104. Those partition designs having an interface UUID that does not match the interface UUID of a partition design running on accelerator 104 may be excluded from the set of available partition designs that may be downloaded to and implemented on accelerator 104.

In block 708, runtime engine 110 generates a partition tracking data structure that tracks each partition design deployed to accelerator 104. The data structure may include a record of each partition design downloaded to run on accelerator 104. Each record, for example, may include the logic UUID and interface UUID(s) for a partition design implemented on accelerator 104. As partition designs are removed from accelerator 104, runtime engine 110 is capable of removing the record for the partition design from the data structure. Thus, the data structure maintained by runtime engine 110 specifies each partition design that is implemented in IC 120 at any given time.

The partition tracking data structure may be used by runtime engine 110 to control any subsequent acceleration card 104 configuration operations. For example, in response to a request received from a system administrator or other source to load a particular partition design (e.g., a provider partition design or a user partition design), runtime engine 110 acquires the interface UUID values of the particular partition design specified by the request. Runtime engine 110 is capable of checking compatibility of the partition design with respect to the base partition design by comparing the interface UUIDs. By checking compatibility, runtime engine 110 avoids implementing a partition design on accelerator 104 that is incompatible with partition design(s) currently running on accelerator 104 and that may disrupt operation of host computer 102 and/or accelerator 104.

Figure 8:
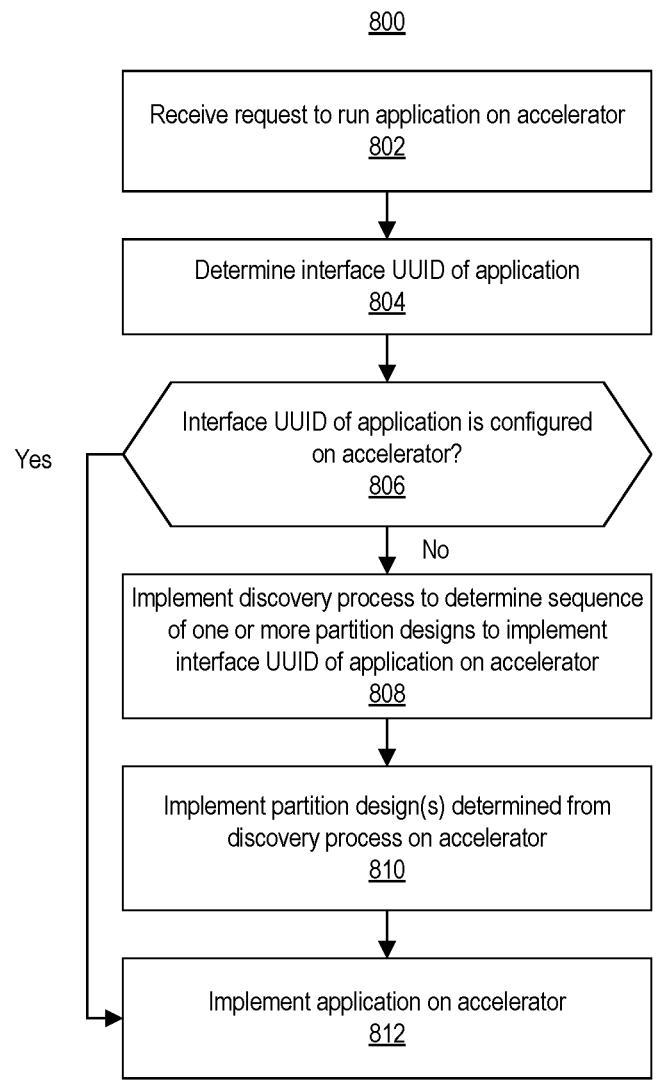
FIG. 8 illustrates an example method of autoloading performed by a host computer executing a runtime engine.

FIG. 8 illustrates an example method 800 of autoloading performed by host computer 102 executing runtime engine 110. In the example of FIG. 8, runtime engine 110 has determined the partition designs currently running on accelerator 104 and their corresponding interface UUIDs.

In block 802, runtime engine 110 receives a request to run an application on accelerator 104. The request may be an electronic request from a system administrator or an application executing in host computer 102. As discussed, an application may be a single partition design or a combination of two or more partition designs.

In block 804, runtime engine 110 determines the interface UUID of the application specified by the request. In one aspect, the request may specify the interface UUID of the application. In another aspect, runtime engine 110 may locate the interface UUID from the aforementioned directory structures using identifying information for the application, other than the interface UUID, specified in the request. In block 806, runtime engine 110 determines whether the interface UUID of the application is configured on accelerator 104. For example, runtime engine 110 is capable of searching or inspecting the partition tracking data structure to determine whether a partition design that implements the interface UUID of the application is implemented in IC 120.

In response to determining that the interface UUID of the application is available on accelerator 104, method 800 continues to block 812 where runtime engine 110 implements the partition design for the application on accelerator 104. In response to determining that the interface UUID of the application is not available on accelerator 104, method 800 implements a discovery process in block 808 to determine whether a sequence of one or more partition designs installed on host computer 102 may be implemented within IC 120 to implement the interface UUID of the application therein.

In one aspect, the discovery process of block 808 may include runtime engine 110 traversing the machine-readable directories of installed partition installer packages within host computer 102 to generate a sequence of one or more compatible partition designs that implement the interface UUID of the application. For example, runtime engine 110 may inspect the directory structure as a graph where runtime engine 110 generates a sequence of partition designs, linked by compatible interface UUIDs, to arrive at a partition design that provides the interface UUID of the requested application. In one aspect, runtime engine 110 determines the shortest viable path, formed of one or more other partition designs, to link the interface UUID of the application with that of the interface UUID of the partition design already implemented in IC 120 (e.g., the base partition design or provider partition design).

As an illustrative example, runtime engine 110 is capable of performing an iterative traversal of the installed partition directory structure. Runtime engine 110 may begin by acquiring a list of installed partition designs that are aligned to interface UUID of the application and then determine other interface UUIDs from those installed partitions. Runtime engine 110 may perform a depth first search until the interface UUID of the base partition design deployed to accelerator 104 is found or all of the interface UUIDs have been considered and no further directory traversals are possible. The traversal requiring the fewest number of partition design downloads to accelerator 104 may be selected.

In block 810, runtime engine 110 implements the partition designs determined in the discovery process on accelerator 104. The partition designs that are implemented establish connectivity between the partition design currently running on accelerator 104 and the requested application. After block 810, method 800 may continue to block 812 to implement the application on accelerator 104. In another aspect, blocks 810 and 812 may be performed in combination (e.g., concurrently).

Once partition installer packages have been successfully installed on host computer 102 and the partition designs implemented on accelerator 104, runtime engine 110 may also use the machine-readable directory structures of such partition designs to determine or identify features of the partition designs running on accelerator 104. As such, runtime engine 110 is capable of correctly controlling acceleration 104 and managing hardware services of accelerator 104 for correct operation of each user's application running thereon.

In conventional platforms, the host runtime software is programmed with advanced knowledge of the types of features available on the accelerator. That advanced knowledge programmed into the host runtime software was used to operate and control the platform implemented on the accelerator. Including such advanced knowledge in the host runtime software, however, requires broad coordination and agreement across all hardware platforms to implement the same feature the same way and at the same location in the system address map. While this approach may work for a relatively small number of similar platforms, such an approach reaches a scaling limit as the number of different accelerators and variations of partitions on those accelerators begins to increase. Compromises such as branching the host runtime software into specializations for each accelerator may extend the usability of such an approach. Maintaining several branches of host runtime software, however, is costly and undesirable.

The inventive arrangements described herein utilize the data driven approach where runtime engine 110 utilizes the installed partition directory structures to implement feature discovery similar to partition discovery. The use of logic UUIDs and interface UUIDs provides a stable foundation for this data driven approach.

In general, features of partition designs are implemented by one or more addressable endpoints within the respective partition designs. As defined within this disclosure, the term "addressable endpoint" means a circuit block, e.g., a portion of circuitry implemented in IC 120 by implementing a partition design therein. The circuit block, being part of the partition design, may be accessed or addressed by host computer 102 by way of a communication link established by appropriate interconnection circuitry on accelerator 104 and IC 120. Accordingly, an addressable endpoint provides hardware services that may be accessed by host computer 102.

As an illustrative example, the interconnection circuitry may be compatible with the AXI protocol. IC 120 may implement multiple networks (e.g., AXI networks) that may be distinguished from one another by host computer 102 by augmenting addressing attributes from the domain of the communication link between host computer 102 and accelerator 104 (e.g., a PCIe domain). For example, addressing attributes such as PCIe physical function number, base address register number, or the like may be augmented to access addressable endpoints through particular networks on IC 120.

To operate an addressable endpoint, runtime engine 110 utilizes a tuple specifying addresses for the addressable endpoint. The addresses may be used by runtime engine 110 to send data to the addressable endpoint and receive data from the addressable endpoint. The addressing data of the tuple may be augmented with additional information specifying a role and operating semantics of the addressable endpoint. With suitable addressable endpoint information, runtime engine 110 is capable of dynamically adapting control processes to govern operation of accelerator 104 as partition designs are dynamically implemented on and/or removed from IC 120 in real time (e.g., reconfiguring a partition by way of partial reconfiguration of IC 120). The addressable endpoint information may also specify external dependencies on, for example, compatible firmware versions for hardware features that are realized by embedded microprocessor subsystems.

To facilitate operation of addressable endpoints, the EDA tools are capable of generating a digest of the addressable endpoints present within a partition that may be deployed during the implementation flow for that partition design. FIG. 9 illustrates an example digest for an addressable endpoint. The digest may be implemented in a machine-readable form. For example, referring to the examples of FIGS. 5 and 6, the digest may be implemented as the "partition_metadata.json" file. JavaScript Object Notation may be used to specify the digest. The digest may be included in the partition installer package for installation on computer system 102. It should be appreciated that the digest may be specified in any of a variety of different forms such as markup language or as other structured text.

In one aspect, the addressable endpoints specified within partition metadata installed on host computer 102 may conform to an enumerated set of standard, established addressable endpoint roles. For example, if a partition design contains an addressable endpoint such as an embedded runtime scheduler that is capable of scheduling the operation of application kernels, the addressable endpoint "ep_ert_sched_00" will be included in the digest for the partition. The addressable endpoint names may be established in advance according to the possible range of partition design features. Addressable endpoint names need not be bound to any specific addressing path, but rather may be subordinate elements within the endpoint declaration itself. The presence or absence of declarations informs runtime engine 110 of the feature set of the partition (e.g., where features of the partition design are indicated by declarations and features not included in the partition design are absent).

The endpoint declaration may also include a register abstraction name. The register abstraction name is a token that represents a pre-determined software programmable register interface of provided by the set of hardware services that may implement the addressable endpoint. Many different hardware IPs may be created and optimized for different acceleration circumstances but align to the same register abstraction name. Runtime engine 110 need not deal with lower-level hardware details and parameters provided the register abstraction identified by the register abstraction name is maintained. In the event of a significant change in a hardware service providing the feature or, for example, the evolution of an existing service to include new capabilities, a new register abstraction may be defined (or an existing abstraction up-versioned).

Within the example digest of FIG. 9, additional card-to-host communication paths such as interrupt trees may also be specified. In the example, the role and operating semantic of the interrupt is pre-determined by enumerating the interrupt namespace and reserving names to specific purposes. Interrupt enumerations may be bound to an interrupt index at a later time (e.g., similar to the addressable endpoint declaration of address path sub-elements). With this information and/or other similar or equivalent information for other addressable endpoints, runtime engine 110 is capable of dynamically, e.g., during runtime, constructing a network of one or more sub-device drivers that are tuned to the presence and programming interface of the hardware services available from the respective partition designs deployed to accelerator 104. These sub-device drivers may utilize the interrupts for the addressable endpoint enumerated in the digest.

Figure 10:
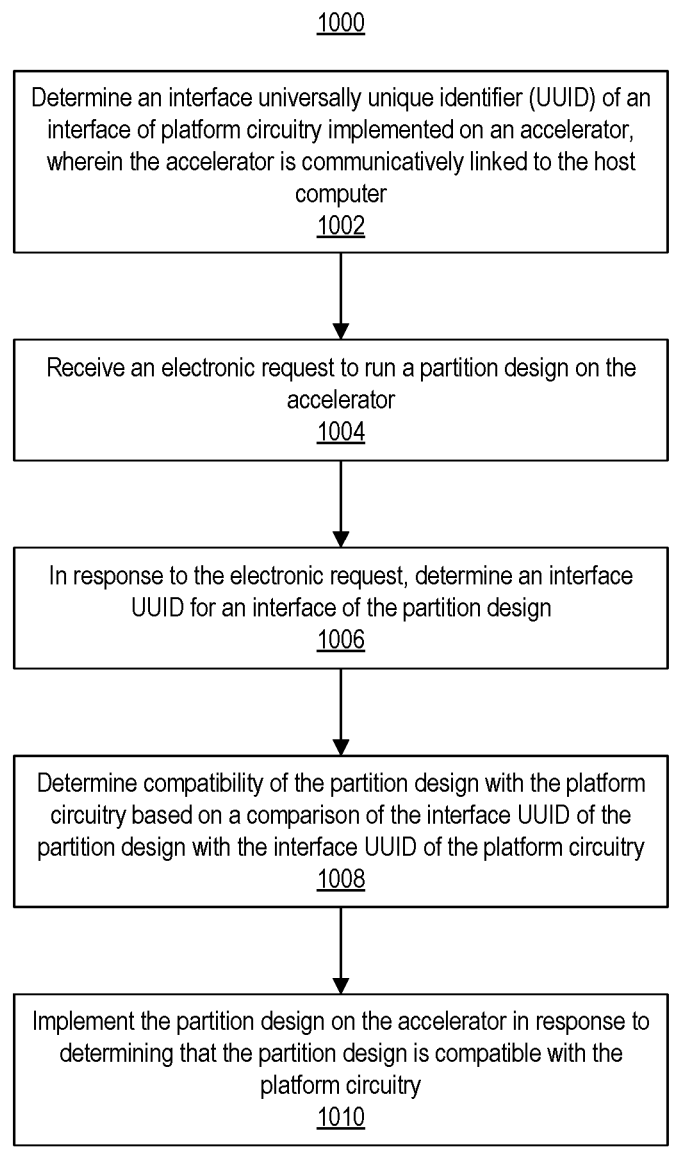
FIG. 10 illustrates an example method of operation of a host computer executing a runtime engine as described within this disclosure.

FIG. 10 illustrates an example method 1000 of operation for a host computer executing a runtime engine as described within this disclosure.

In block 1002, host computer 102 is capable of determining an interface UUID of an interface of platform circuitry implemented in IC 120 of accelerator 104. Accelerator 104 is communicatively linked to host computer 102. In one aspect, the platform circuitry implements one or more partitions that conform to a chassis such as chassis 130. The partition design may be a base partition design implemented in base partition 132. The interface UUID of the platform circuitry may be the interface UUID of the base partition design. Runtime engine 110 is capable of determining the interface UUID of the platform circuitry by reading the interface UUID from IC 120. For other types of partition designs deployed to accelerator 104, the interface UUID may be determined from the partition design tracking data structure maintained by runtime engine 110.

In block 1004, host computer 102 receives an electronic request to run a partition design on accelerator 104. In block 1006, host computer 102 determines an interface UUID for an interface of the partition design in response to the electronic request. For example, runtime engine 110 is capable of locating the installation directory corresponding to the application and determining the interface UUID therefrom. The request may specify a identifying information for the application that runtime engine 110 may use to locate the directory corresponding to the application. In block 1008, host computer 102 determines compatibility of the partition with the platform circuitry. For example, host computer 102 determines compatibility based on a comparison of the interface UUID of the partition design (e.g., the interface of the partition design) with the interface UUID of the platform circuitry (e.g., the interface UUID of the interface of the platform circuitry).

In block 1010, host computer 102 is capable of implementing the partition design on accelerator 104 in response to determining that the partition design is compatible with the platform circuitry.

The foregoing and other implementations can each optionally include one or more of the following features, alone or in combination. Some example implementations include all the following features in combination.

In one aspect, determining compatibility, as performed by host computer 102, may include determining that the interface UUID of the interface of the subsystem matches the interface UUID of the interface of the platform circuitry.

In another aspect, the interface UUID for the interface of the platform circuitry is determined by reading the interface UUID from a partition tracking data structure stored on the host computer or by reading, from the accelerator, a logic UUID associated with the interface UUID.

In another aspect, determining compatibility, as performed by host computer 102, can include determining that the platform circuitry does not include an interface UUID matching the interface UUID of the subsystem. In that case, host computer 102 is capable of determining a sequence of one or more partition designs installed on host computer 102 that are implementable on accelerator 104 to integrate the partition design with the platform circuitry. Host computer 102 is capable of implementing the sequence of one or more partition designs on accelerator 104 with the partition design.

In another aspect, host computer 102, e.g., via execution of runtime engine 110, configures itself to access an addressable endpoint implemented by the partition design based on metadata for the addressable endpoint read from a directory of host computer 102 corresponding to the partition design. The metadata may include the digest for the addressable endpoint.

In another aspect, the metadata specifies address information for the addressable endpoint. The metadata may also specify a register abstraction token specifying a predetermined software programmable register interface of the addressable endpoint.

In another aspect, configuring host computer 102 can include installing, within the host computer, a sub-device driver executable by host computer 102 for communicating with the addressable endpoint.

In another aspect, the metadata specifies an interrupt tree of the addressable endpoint. The interrupt tree may specify one or more interrupts of the addressable endpoint. The interrupt tree is readable by host computer 102 to generate an interrupt to the addressable endpoint of the partition design.

In another aspect, the interface UUIDs are created prior to runtime of host computer 102 as a cryptographic hashes of time-invariant design data for the respective interfaces.

In another aspect, host computer 102 is capable of reading a logic UUID from IC 120, wherein the logic UUID is for a base partition design of the platform circuitry. The logic UUID may be a cryptographic hash of time-invariant design data for the base partition design. Host computer 102 is capable of determining whether the base partition design is installed therein based on reading a data structure specifying partition designs installed on host computer 102. The data structure is organized, at least in part, according to logic UUIDs of the respective partition designs.

In another aspect, host computer 102 is capable of reading a logic UUID from IC 120, wherein the logic UUID is for a base partition design of the platform circuitry, locating a directory installed on the host computer based on the logic UUID, and determining an interface UUID for an interface of the base partition design from the directory. The interface UUID of the interface of the base partition design is used as the interface UUID of the platform circuitry.

Figure 11:
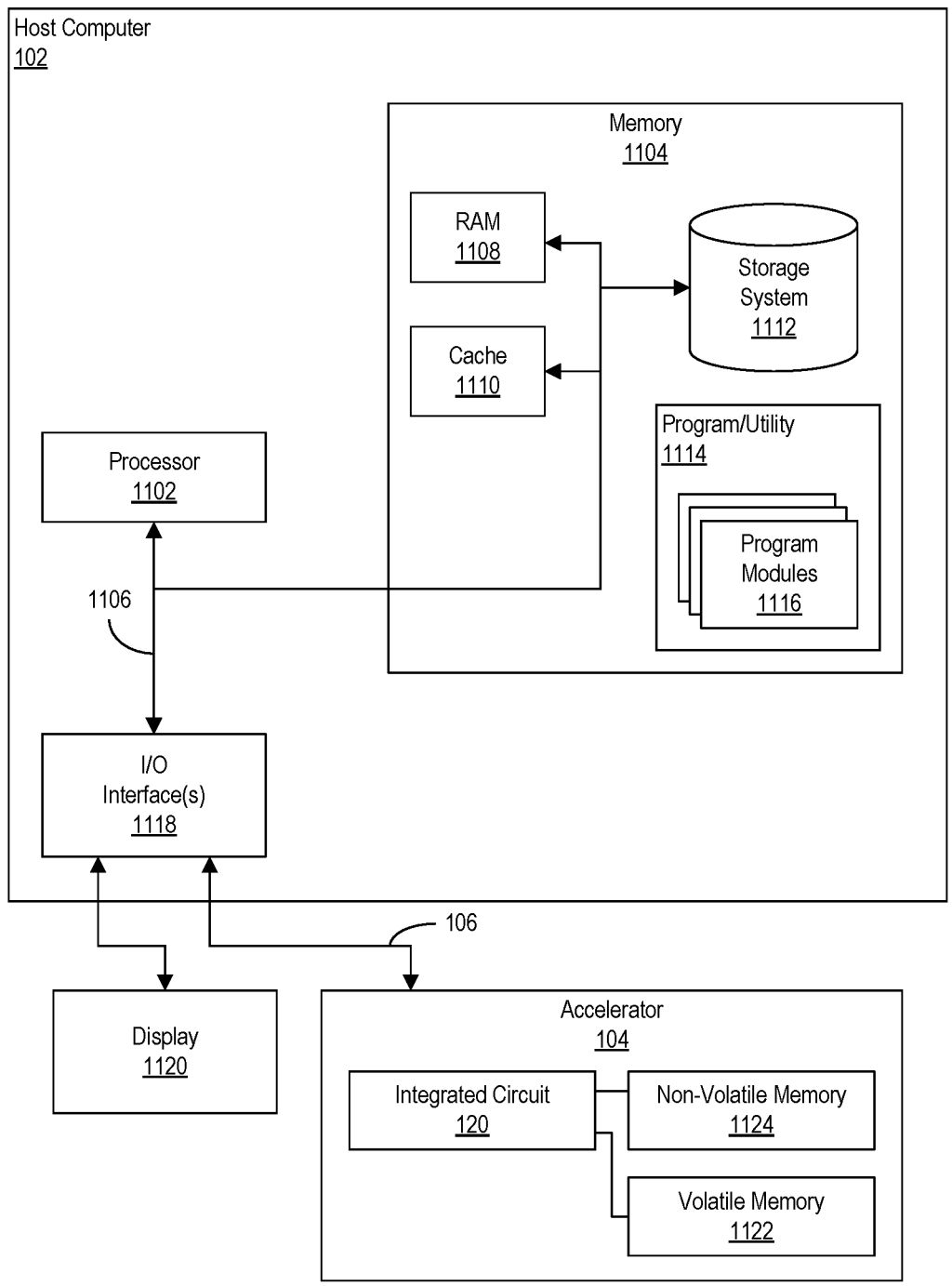
FIG. 11 illustrates another example implementation of a computing environment having a host computer communicatively linked with an accelerator.

FIG. 11 illustrates an example implementation of computing environment 100. Computing environment 100 includes host computer 102 coupled to accelerator 104 via communication link 106.

Host computer 102 can be described in the general context of computer system-executable instructions, such as program modules, that are executable by a computer system. Generally, program modules can include routines, programs, objects, components, logic, data structures, and so on that perform particular tasks or implement particular abstract data types. Host computer 102 can be practiced as a standalone computer system such as a server or in distributed cloud computing environments where tasks are performed by remote processing devices that are linked through a communications network. In a distributed cloud computing environment, program modules may be located in both local and remote computer system storage media including memory storage devices.

As shown in FIG. 11, the components of host computer 102 can include, but are not limited to, a processor 1102, a memory 1104, and a bus 1106 that couples various system components including memory 1104 to processor 1102. Processor 1102 may be implemented as one or more processors. In an example, processor 1102 is implemented as a central processing unit (CPU).

Bus 1106 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Host computer 102 typically includes a variety of computer system readable media. Such media may include computer-readable volatile and non-volatile media and computer-readable removable and non-removable media.

Memory 1104 can include computer-readable media in the form of volatile memory, such as random-access memory (RAM) 1108 and/or cache memory 1110. Host computer 102 can also include other removable/non-removable, volatile/non-volatile computer storage media. By way of example, storage system 1112 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1106 by one or more data media interfaces. Memory 1104 is an example of at least one computer program product.

Program/utility 1114, having a set (at least one) of program modules 1116, may be stored in memory 1104. By way of example, program modules 1116 may represent an operating system, one or more application programs, other program modules, and program data. Program modules 1116 generally carry out the functions and/or methodologies of the example implementations described within this disclosure. For example, one or more of program modules 1116 can implement runtime engine 110 and/or perform the various operations described within this disclosure for host computer 102 and/or the EDA tools.

Program/utility 1114 is executable by processor 1102. Program/utility 1114 and any data items used, generated, and/or operated upon by host computer 102 are functional data structures that impart functionality when employed by host computer 102. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Host computer 102 may include one or more Input/Output (I/O) interfaces 1118 communicatively linked to bus 1106. I/O interface(s) 1118 allow host computer 102 to communicate with external devices, couple to external devices that allow user(s) to interact with host computer 102, couple to external devices that allow host computer 102 to communicate with other computing devices, and the like. For example, host computer 102 may be communicatively linked to a display 1120 and to accelerator 104 through I/O interface(s) 1118 and communication link 106. Host computer 102 may be coupled to other external devices such as a keyboard (not shown) via I/O interface(s) 1118. Examples of I/O interfaces 1118 may include, but are not limited to, network cards, modems, network adapters, hardware controllers, etc.

In an example implementation, the I/O interface 1118 through which host computer 102 communicates with accelerator 104 is a PCIe adapter where communication link 106 is a PCIe communication channel. Accelerator 104 may be implemented as a circuit board that couples to host computer 102. Accelerator 104 may, for example, be inserted into a card slot, e.g., an available bus and/or PCIe slot, of host computer 102.

Accelerator 104 includes IC 120. Accelerator 104 also includes volatile memory 1122 coupled to IC 120 and a non-volatile memory 1124 also coupled to IC 120. Volatile memory 1122 may be implemented as a RAM. In the example of FIG. 11, volatile memory 1122 is external to IC 120, but is still considered a "local memory" of IC 120, whereas memory 1104, being within host computer 102, is not considered local to IC 120. In some implementations, volatile memory 1122 may include multiple gigabytes of RAM, e.g., 64 GB of RAM. Non-volatile memory 1124 may be implemented as flash memory. Non-volatile memory 1124 is also external to IC 120 and may be considered local to IC 120.

Host computer 102 is only one example implementation of a computer. Host computer 102 may be used in a standalone capacity, e.g., as a user computing device or a server, as part of a computing cluster (e.g., two or more interconnected computers), or as a cloud computing node. The example of FIG. 11 is not intended to suggest any limitation as to the scope of use or functionality of example implementations described herein. Host computer 102 is an example of a system and/or computer hardware that is capable of performing the various operations described within this disclosure.

In this regard, host computer 102 may include fewer components than shown or additional components not illustrated in FIG. 11 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Host computer 102 may be operational with numerous other general-purpose or special-purpose computing system environments or configurations. Examples of computing systems, environments, and/or configurations that may be suitable for use with host computer 102 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

Some computing environments, e.g., cloud computing environments and/or edge computing environments using host computer 102 or other suitable data processing system, generally support the FPGA-as-a-Service (FaaS) model. In the FaaS model, user functions are hardware accelerated as circuit designs implemented within programmable ICs operating under control of the (host) data processing systems. Other examples of cloud computing models are described in the National Institute of Standards and Technology (NIST) and, more particularly, the Information Technology Laboratory of NIST.

Host computer 102 is also an example implementation of one or more EDA tools. Program modules 1116, for example, may include software that is capable of performing an implementation flow on a circuit design or portion thereof (e.g., a partition, IP, or the like). In this regard, host computer 102 serves as an example of one or more EDA tools or a system that is capable of processing circuit designs and/or generating configuration data for accelerator 104 and/or IC 120 as described herein. It should be appreciated that FIG. 11 is provided as an example and that the EDA tools may be implemented in a different computer than host computer 102.

Figure 12:
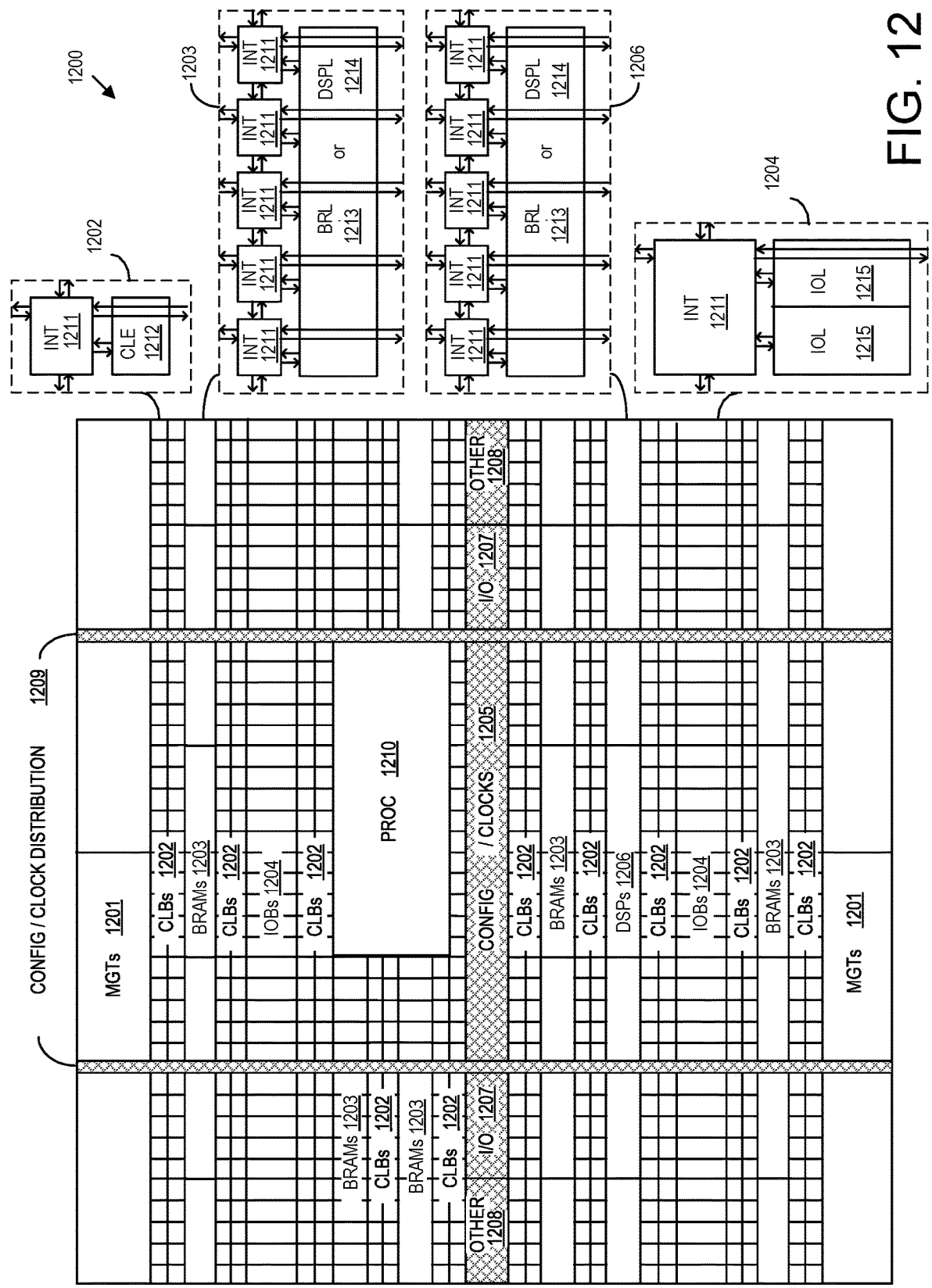
FIG. 12 illustrates an example architecture for an integrated circuit (IC).

FIG. 12 illustrates an example architecture 1200 for an IC. In one aspect, architecture 1200 may be implemented within a programmable IC. For example, architecture 1200 may be used to implement an FPGA. Architecture 1200 may also be representative of an SoC type of IC. An SoC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 1200 includes several different types of programmable circuit, e.g., logic, blocks. For example, architecture 1200 may include a large number of different programmable tiles including multi-gigabit transceivers (MGTs) 1201, configurable logic blocks (CLBs) 1202, random access memory blocks (BRAMs) 1203, input/output blocks (IOBs) 1204, configuration and clocking logic (CONFIG/CLOCKS) 1205, digital signal processing blocks (DSPs) 1206, specialized I/O blocks 1207 (e.g., configuration ports and clock ports), and other programmable logic 1208 such as digital clock managers, analog-to-digital converters, system monitoring logic, and so forth.

In some ICs, each programmable tile includes a programmable interconnect element (INT) 1211 having standardized connections to and from a corresponding INT 1211 in each adjacent tile. Therefore, INTs 1211, taken together, implement the programmable interconnect structure for the illustrated IC. Each INT 1211 also includes the connections to and from the programmable logic element within the same tile, as shown by the examples included at the right of FIG. 12.

For example, a CLB 1202 may include a configurable logic element (CLE) 1212 that may be programmed to implement user logic plus a single INT 1211. A BRAM 1203 may include a BRAM logic element (BRL) 1213 in addition to one or more INTs 1211. Typically, the number of INTs 1211 included in a tile depends on the height of the tile. As pictured, a BRAM tile has the same height as five CLBs, but other numbers (e.g., four) also may be used. A DSP tile 1206 may include a DSP logic element (DSPL) 1214 in addition to an appropriate number of INTs 1211. An IOB 1204 may include, for example, two instances of an I/O logic element (IOL) 1215 in addition to one instance of an INT 1211. The actual I/O pads connected to IOL 1215 may not be confined to the area of IOL 1215.

In the example pictured in FIG. 12, a horizontal area near the center of the die, e.g., formed of regions 1205, 1207, and 1208, may be used for configuration, clock, and other control logic. Vertical areas 1209 extending from this horizontal area may be used to distribute the clocks and configuration signals across the breadth of the programmable IC.

Some ICs utilizing the architecture illustrated in FIG. 12 include additional logic blocks that disrupt the regular columnar structure making up a large part of the IC. The additional logic blocks may be programmable blocks and/or dedicated circuitry. For example, a processor block depicted as PROC 1210 spans several columns of CLBs and BRAMs.

In one aspect, PROC 1210 may be implemented as dedicated circuitry, e.g., as a hardwired processor, that is fabricated as part of the die that implements the programmable circuitry of the IC. PROC 1210 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 1210 may be omitted from architecture 1200 and replaced with one or more of the other varieties of the programmable blocks described. Further, such blocks may be utilized to form a "soft processor" in that the various blocks of programmable circuitry may be used to form a processor that can execute program code as is the case with PROC 1210.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 12 that are external to PROC 1210 such as CLBs 1202 and BRAMs 1203 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 1210.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SoC, the configuration bitstream may specify the circuitry that is to be implemented within the programmable circuitry and the program code that is to be executed by PROC 1210 or a soft processor. In some cases, architecture 1200 includes a dedicated configuration processor that loads the configuration bitstream to the appropriate configuration memory and/or processor memory. The dedicated configuration processor does not execute user-specified program code. In other cases, architecture 1200 may utilize PROC 1210 to receive the configuration bitstream, load the configuration bitstream into appropriate configuration memory, and/or extract program code for execution.

FIG. 12 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the right of FIG. 12 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 1210 within the IC are for purposes of illustration only and are not intended as limitations.

The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer-readable storage medium" means a storage medium that contains or stores program code for use by or in connection with an instruction execution system, apparatus, or device. As defined herein, a "computer-readable storage medium" is not a transitory, propagating signal per se. A computer-readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer-readable storage media. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "processor" means at least one circuit capable of carrying out instructions contained in program code. The circuit may be an integrated circuit or embedded in an integrated circuit.

As defined herein, the term "real time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer-readable storage medium (or media) having computer-readable program instructions thereon for causing a processor to carry out aspects of the inventive arrangements described herein. Within this disclosure, the term "program code" is used interchangeably with the term "computer-readable program instructions." Computer-readable program instructions described herein may be downloaded to respective computing/processing devices from a computer-readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer-readable program instructions may include state-setting data. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer-readable program instructions by utilizing state information of the computer-readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer-readable program instructions, e.g., program code.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the operations specified in the flowchart and/or block diagram block or blocks.

The computer-readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
    determining, by a host computer, an interface universally unique identifier (UUID) of an interface of platform circuitry implemented on an accelerator, wherein the accelerator is communicatively linked to the host computer;
    receiving, by the host computer, an electronic request to run a partition design on the accelerator;
    in response to the electronic request, determining, by the host computer, an interface UUID for an interface of the partition design;

determining compatibility of the partition design with the platform circuitry based on a comparison of the interface UUID of the partition design with the interface UUID of the platform circuitry; and implementing the partition design on the accelerator in response to determining that the partition design is compatible with the platform circuitry.

2. The method of claim 1, further comprising:
determining the interface UUID for the interface of the platform circuitry by reading the interface UUID from a partition tracking data structure stored on the host computer or by reading, from the accelerator, a logic UUID associated with the interface UUID.

3. The method of claim 1, further comprising:
determining that the platform circuitry does not include an interface UUID matching the interface UUID of the partition design;
determining a sequence of one or more partition designs installed on the host computer that are implementable on the accelerator to integrate the partition design with the platform circuitry; and
implementing the sequence of one or more partition designs on the accelerator.

4. The method of claim 1, further comprising:
configuring the host computer to access an addressable endpoint implemented by the partition design based on metadata for the addressable endpoint read from a directory of the host computer corresponding to the partition design.

5. The method of claim 4, wherein the metadata specifies address information for the addressable endpoint.

6. The method of claim 4, further comprising:
installing, within the host computer, a sub-device driver executable by the host computer for communicating with the addressable endpoint.

7. The method of claim 4, wherein the metadata specifies an interrupt tree specifying one or more interrupts of the addressable endpoint, wherein the interrupt tree is readable by the host computer to generate an interrupt to the addressable endpoint of the partition design.

8. The method of claim 1, wherein the interface UUIDs are created prior to runtime of the host computer as cryptographic hashes of time-invariant design data for the interfaces.

9. The method of claim 1, further comprising:
reading, by the host computer, a logic UUID from the accelerator, wherein the logic UUID is for a base partition design of the platform circuitry; and
determining whether the base partition design is installed in the host computer based on reading a data structure specifying partition designs installed on the host computer, wherein the data structure is organized, at least in part, according to logic UUIDs of the respective partition designs.

10. The method of claim 1, further comprising:
reading, by the host computer, a logic UUID from the accelerator, wherein the logic UUID is for a base partition design of the platform circuitry;
locating a directory installed on the host computer based on the logic UUID; and
determining an interface UUID for an interface of the base partition design from the directory, wherein the interface UUID of the interface of the base partition design is used as the interface UUID of the platform circuitry.

11. A system, comprising:
a processor configured to initiate operations including:
determining an interface universally unique identifier (UUID) of an interface of platform circuitry implemented on an accelerator, wherein the accelerator is communicatively linked to the system;
receiving an electronic request to run a partition design on the accelerator;
in response to the electronic request, determining an interface UUID for an interface of the partition design;
determining compatibility of the partition design with the platform circuitry based on a comparison of the interface UUID of the partition design with the interface UUID of the platform circuitry; and
implementing the partition design on the accelerator in response to determining that the partition design is compatible with the platform circuitry.

12. The system of claim 11, wherein the processor is configured to initiate operations comprising:
determining the interface UUID for the interface of the platform circuitry by reading the interface UUID from a partition tracking data structure stored on the system or by reading, from the accelerator, a logic UUID associated with the interface UUID.

13. The system of claim 11, wherein the processor is configured to initiate operations comprising:
determining that the platform circuitry does not include an interface UUID matching the interface UUID of the partition design;
determining a sequence of one or more partition designs installed on the system that are implementable on the accelerator to integrate the partition design with the platform circuitry; and
implementing the sequence of one or more partition designs on the accelerator.

14. The system of claim 11, wherein the processor is configured to initiate operations comprising:
configuring the system to access an addressable endpoint implemented by the partition design based on metadata for the addressable endpoint read from a directory of the system corresponding to the partition design.

15. The system of claim 14, wherein the metadata specifies at least one of
address information for the addressable endpoint; or
an interrupt tree specifying one or more interrupts of the addressable endpoint, wherein the interrupt tree is readable by the processor to generate an interrupt to the addressable endpoint of the partition design.

16. The system of claim 15, wherein the processor is configured to initiate operations comprising:
installing, within the system, a sub-device driver executable by the processor for communicating with the addressable endpoint.

17. The system of claim 11, wherein the interface UUIDs are created prior to runtime of the system as cryptographic hashes of time-invariant design data for the interfaces.

18. The system of claim 11, wherein the processor is configured to initiate operations comprising:
reading a logic UUID from the accelerator, wherein the logic UUID is for a base partition design of the platform circuitry; and
determining whether the base partition design is installed in the system based on reading a data structure specifying partition designs installed on the system, wherein the data structure is organized, at least in part, according to logic UUIDs of the respective partition designs.

19. The system of claim 11, wherein the processor is configured to implement operations comprising:

reading a logic UUID from the accelerator, wherein the logic UUID is for a base partition design of the platform circuitry;

locating a directory installed on the system based on the logic UUID; and determining an interface UUID for an interface of the base partition design from the directory, wherein the interface UUID of the interface of the base partition design is used as the interface UUID of the platform circuitry.

20. An integrated circuit comprising:

a base partition implementing a base partition design in programmable circuitry of the integrated circuit, wherein the base partition design is associated with a first universally unique identifier (UUID);

a memory, having a predetermined address, configured to store the first UUID, wherein the first UUID is a cryptographic hash of a post-routed version of the base partition design as implemented in the base partition;

wherein the memory and first UUID are readable by a host data processing system communicatively linked to the integrated circuit through the base partition;

an isolation interface implemented in the programmable circuitry and coupled to the base partition, wherein the isolation interface is associated with a second UUID;

a reconfigurable partition of the programmable circuitry coupled to the isolation interface, wherein the reconfigurable partition implements a partition design that is compatible with the second UUID of the isolation interface; and wherein the host data processing system selects the partition design from a plurality of partition designs based on matching a UUID of an interface of the partition design with the second UUID of the isolation interface.

* * * * *